United States Patent
Beutler et al.

[19]

[11] Patent Number: 5,933,330
[45] Date of Patent: Aug. 3, 1999

[54] PORTABLE RADIOTELEPHONE ARRANGEMENT HAVING A BATTERY PACK AND A DETACHABLE BATTERY

[75] Inventors: Scott D. Beutler, Barrington; Brian J. Hassemer, Gurnee; Mark D. Janninck, Elmhurst; Scott R. Wilcox, Chicago; Albert L. Nagele, Wilmette, all of Ill.

[73] Assignee: Motorola, Inc., Schaumburg, Ill.

[21] Appl. No.: 09/078,794

[22] Filed: May 14, 1998

[51] Int. Cl.$^6$ ................................. H04B 1/03; H01M 2/10
[52] U.S. Cl. ........................... 361/814; 320/114; 429/99; 455/575; 379/433; D14/138
[58] Field of Search ..................... 361/807, 814; 455/90, 572, 573, 575, FOR 121; 379/433, 428; 320/107, 114; D13/103; 429/96–100; D14/138

[56] References Cited

U.S. PATENT DOCUMENTS

| | | | |
|---|---|---|---|
| 5,136,229 | 8/1992 | Galvin | 455/573 X |
| 5,548,824 | 8/1996 | Inubushi et al. | |
| 5,604,050 | 2/1997 | Brunette et al. | |
| 5,738,954 | 4/1998 | Latella et al. | 429/97 |
| 5,783,327 | 7/1998 | Mendolia | 429/97 |

FOREIGN PATENT DOCUMENTS 875026  8/1993  Japan .

OTHER PUBLICATIONS

US Patent Application Ser. No. 08/442,047, entitled: "Battery Continuation Apparatus and Method Thereof", filed on May 16, 1995, in the name of Motorola, Inc. U.S. Patent 5,738,954.

*Primary Examiner*—Gregory Thompson
*Assistant Examiner*—Jayprakash N. Gandhi
*Attorney, Agent, or Firm*—John J. King

[57] ABSTRACT

A portable radiotelephone (100) arrangement is disclosed. The portable radiotelephone is preferably foldable and comprises a first housing (102) and a second housing (108) hingedly connected to the first housing portion. The second housing portion has a recess for receiving a battery pack (115) and a battery cover (114) for covering the battery pack. Further, a detachable battery (2600) is coupled to the radiotelephone and covering at least a portion of the battery cover. The first housing portion of the foldable portable radiotelephone may also include a display (126) and a speaker (120). The second housing portion may further include a keypad (136) and an antenna (202).

5 Claims, 33 Drawing Sheets

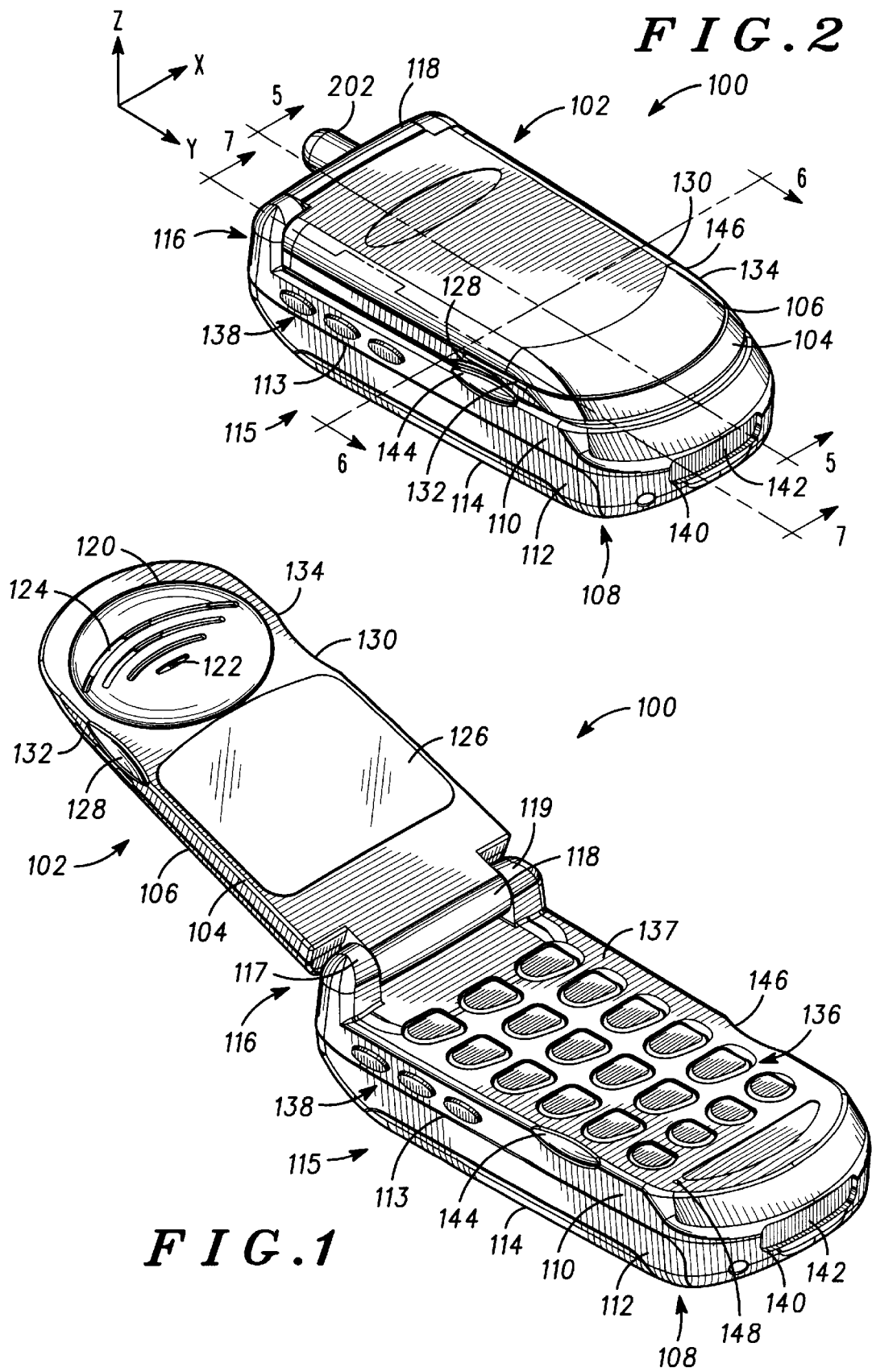

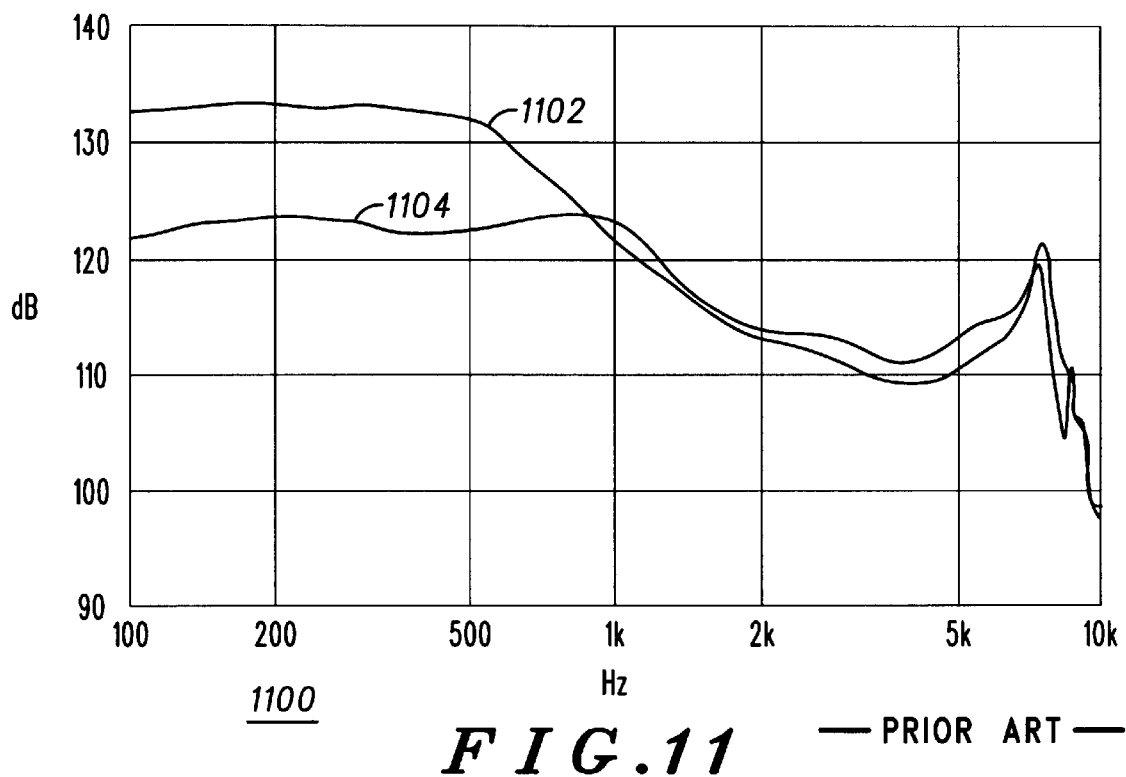
*FIG.11* — PRIOR ART —
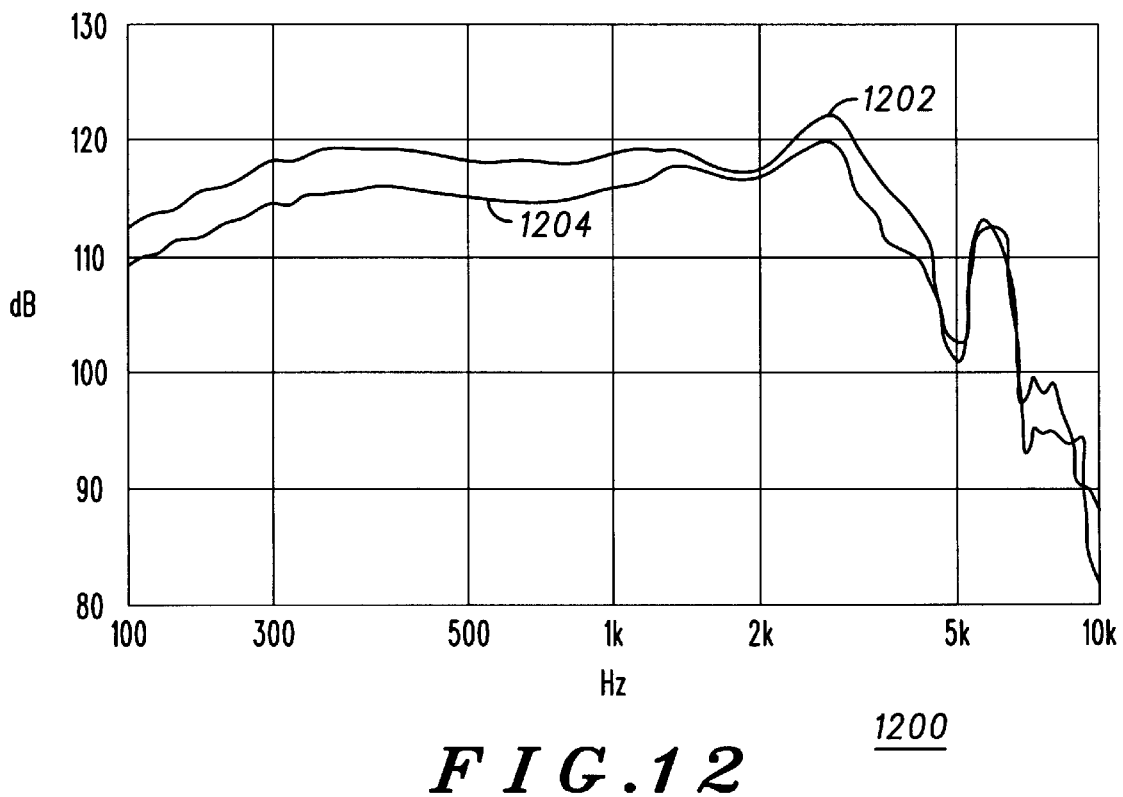
*FIG.12*

PORTABLE RADIOTELEPHONE ARRANGEMENT HAVING A BATTERY PACK AND A DETACHABLE BATTERY

FIELD OF THE INVENTION

The present invention relates generally to the field of assemblies for portable radiotelephones.

BACKGROUND OF THE INVENTION

As portable communication devices become smaller and lighter, plastic housing are generally thinner and there is less room to position sufficient latches securing the housing. In a portable device, such as a portable radiotelephone, it is important that housings are designed to provide efficient use of space and ease of assembly.

Accordingly, a need exists for an improved radiotelephone arrangement.

BRIEF DESCRIPTION OF THE DRAWINGS

FIG. 1 is a perspective view of a portable radiotelephone in an open position.

FIG. 2 is a perspective view of the portable radiotelephone in a closed position.

FIG. 11 is a graph showing audio responses of the prior art.

FIG. 12 is a graph showing audio responses of the portable radiotelephone.

FIG. 15-B is a top plan view of showing an antenna in the down position attached to a transceiver board according to the present invention.

FIG. 15-C is a top plan view of showing an antenna in the down position attached to a transceiver board according to the present invention.

FIG. 16-B is cross-sectional view of an antenna having a movable contact in a second position according to the present invention.

DETAILED DESCRIPTION OF THE PREFERRED EMBODIMENTS

Figure 3:
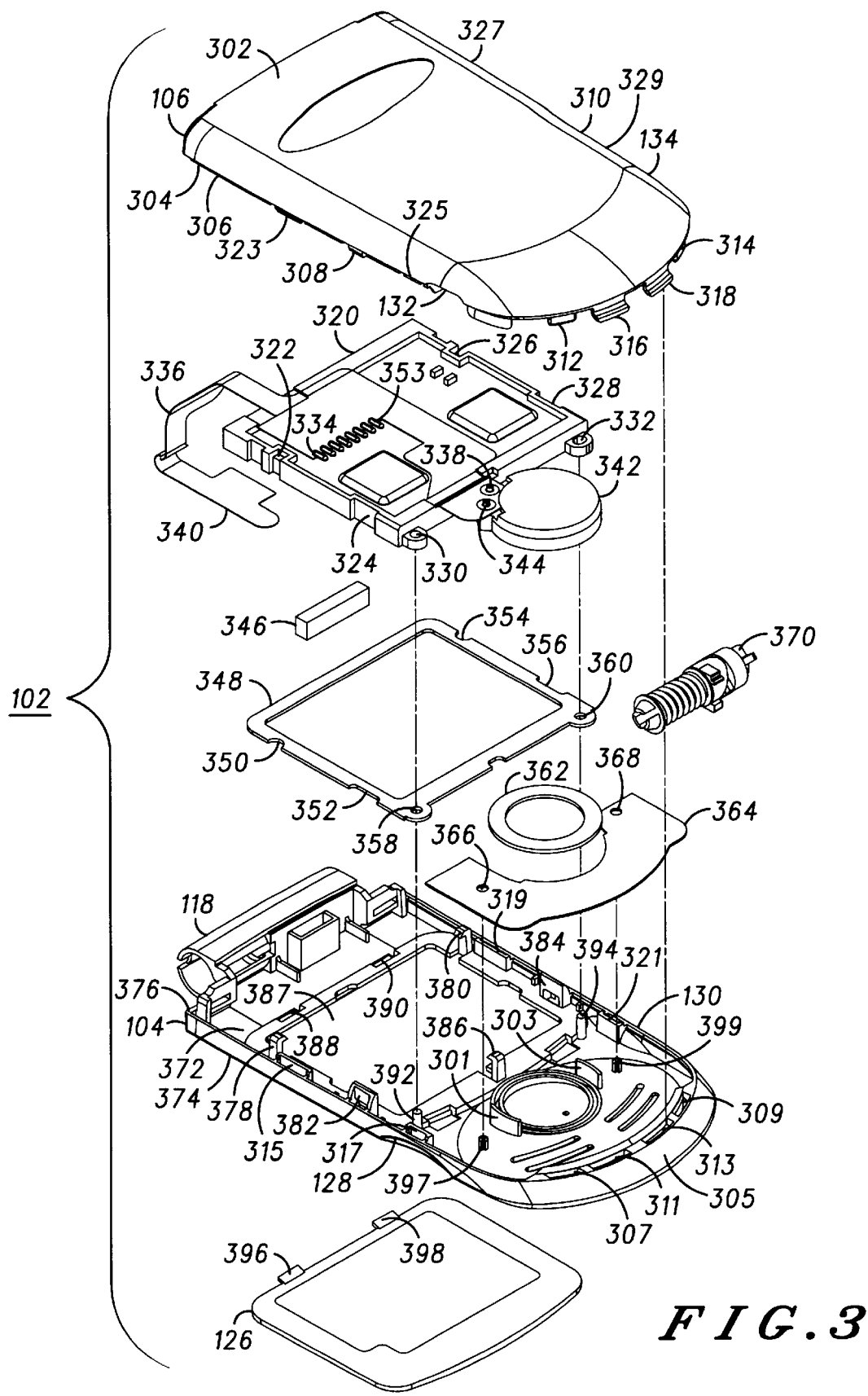
FIG. 3 is a rear, top, left side exploded view of an upper housing of the portable radiotelephone.

A portable radiotelephone arrangement is disclosed. The portable radiotelephone is preferably foldable and comprises a first housing and a second housing hingedly connected to the first housing. The second housing has a recess for receiving a battery pack and a battery cover for covering the battery pack. Further, a detachable battery is coupled to the radiotelephone and covering at least a portion of the battery cover. The first housing of the foldable portable radiotelephone may also include a display and a speaker. The second housing portion may further include a keypad and an antenna.

FIG. 1 shows a perspective view of a portable radiotelephone 100. Portable radiotelephone 100 is a portable electronic device and, more particularly, a portable electronic device that provides for wireless communication via radio frequency (RF) signals. Portable radiotelephone 100 may be operable in cellular telephone systems and is commonly referred to as a portable cellular telephone.

Portable radiotelephone 100 has an upper housing 102 and a lower housing 108 rotatably connected via a hinge 116. Portable radiotelephone 100 has a open position, as shown in FIG. 1, and a closed position, as shown in FIG. 2. Orientation axes are also shown in FIG. 2. With such a configuration, portable radiotelephone 100 is commonly referred to as a foldable or clamshell style telephone.

Upper and lower housings 102 and 108 form a housing that is very small in size, and preferably sized for handheld usage and clothing pocket portability. For example, in this embodiment, the housing has dimensions of approximately 83 mm in length, 42 mm in width, and 26 mm in depth (in the closed position, FIG. 2). Upper and lower housings 102 and 108 are made from a durable and somewhat flexible material, such as a polycarbonate.

Upper housing 102 is formed by a front housing portion 104 and a rear housing portion 106. Front housing portion 104 forms a barrel 118 of hinge 116. A display lens 126 is carried on upper housing 102 and is substantially flush with a front surface thereof. A finger recess 128 (optional) is formed along the front and a left side surface of upper housing 102, and a finger recess 130 (optional) is formed along the front and a right side surface of upper housing 102. Upper housing 102 also has an ear placement region 120 on the front surface, where an ear of a user is positioned for listening to voice signals from a speaker (not visible in FIGS. 1 and 2). An opening 122 and a plurality of additional openings, such as an opening 124, are formed on the front surface within ear placement region 120. Also, an opening 132 is formed on the left side surface and an opening 134 is formed on the right side surface.

Similar to upper housing 102, lower housing 108 is formed by a front housing portion 110 and a rear housing portion 112. A plurality of input keys 136, including conventional telephone keys (0–9, *, and #) and function keys, are exposed on a front surface of lower housing 108. In addition, a plurality of input keys 138 are exposed on a left side surface of lower housing 108. An antenna 202 (FIG. 2) is positioned at a top surface of lower housing 108. An opening 140 is formed on a bottom surface of lower housing 108 and exposes an electrical connector 142 provided for communication of input/output data or receiving electrical energy through a cigarette lighter adapter (not shown). A detachable battery cover 114 is detachably carried on a bottom surface of lower housing 108 and covers a battery (not shown in FIGS. 1 and 2). An opening 148 is formed on the front surface, where a mouth of a user is positioned for talking into a microphone (not visible in FIGS. 1 and 2). A finger recess 144 is formed along the front and the left side surface, and a finger recess 146 is formed along the front and a right side surface of lower housing 108. When portable radiotelephone 100 is in the closed position (FIG. 2), finger recesses 128 and 130 meet with finger recesses 144 and 146, respectively, and cooperate to provide assistance for opening portable radiotelephone 100.

Figure 4:
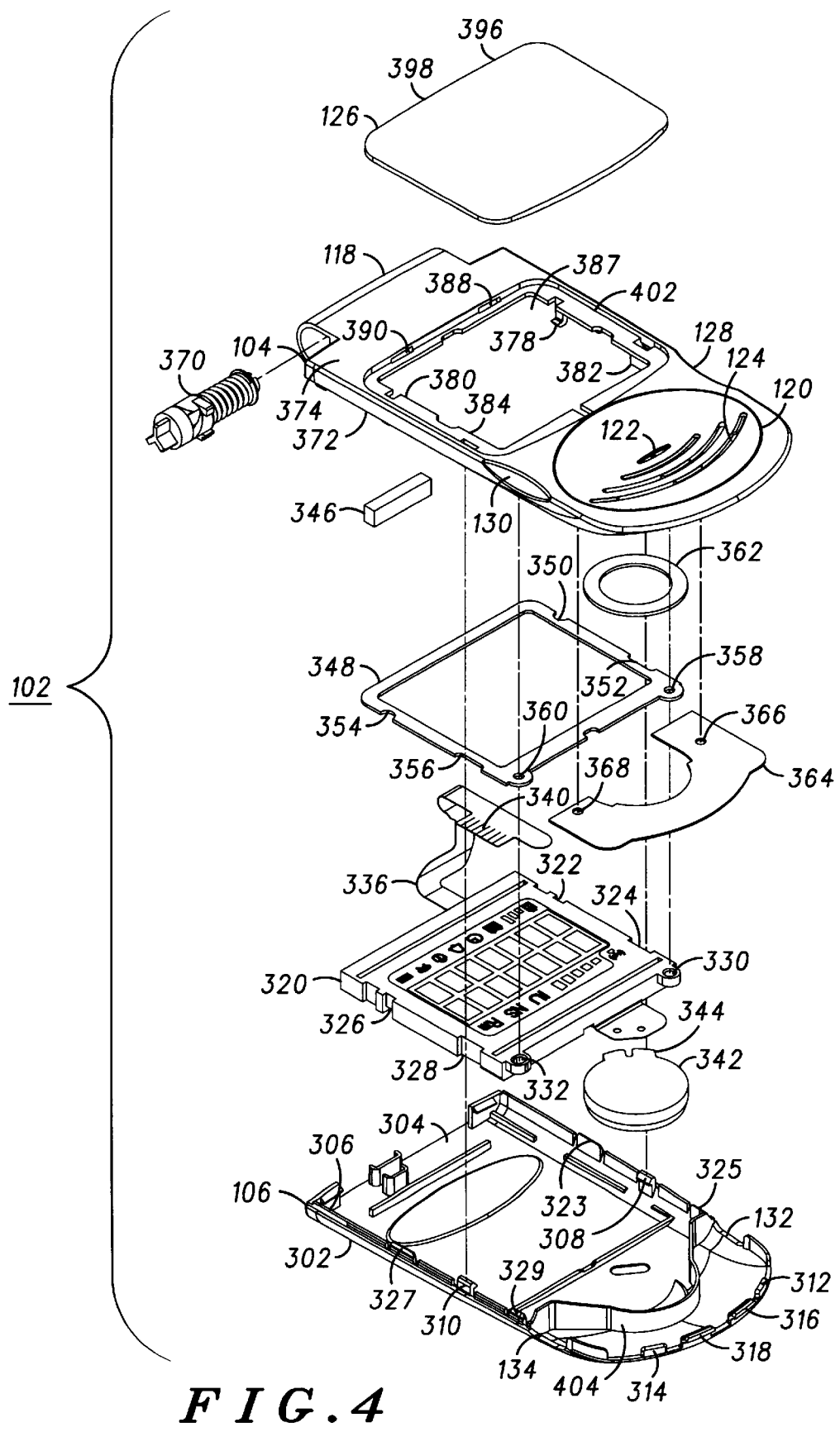
FIG. 4 is a front, top, right side exploded view of the upper housing.

FIGS. 3 and 4 show a top perspective exploded view and a bottom perspective exploded view, respectively, of upper housing 102. FIGS. 3 and 4 will be referred to in combination in the description that follows. Upper housing 102 includes front housing portion 104 and rear housing portion 106, as well as a visual display assembly 320, a flexible connector 336, a speaker 342, a magnet 346, a display gasket 348, a speaker gasket 362, a felt 364, a hinge assembly 370, and display lens 126.

Rear housing portion 106 forms a housing shell having an outside surface 302, an inside surface 304, and a mating perimeter 306 along a top of walls of the housing shell. In the embodiment shown, outside surface 302 forms a substantially planar surface. Tabs 327 and 329 are formed generally along and within boundaries of a portion of mating perimeter 306 on a left side of rear housing portion 106. Likewise, tabs 323 and 325 are formed generally along and within boundaries of a portion of mating perimeter 306 on a right side of rear housing portion 106. Tabs 323, 325, 327, and 329 generally extend outward from inside surface 304.

Tabs 312 and 314 and L-shaped tabs 316 and 318 are formed along a portion of mating perimeter 306 on a top end of rear housing portion 106. L-shaped tabs 308 and 310 are formed along a portion of mating perimeter 306 on the left and right sides, respectively. L-shaped tabs 316 and 318 generally extend outward from inside surface 304 and then away from the top end. L-shaped tabs 308 and 310 generally extend outward from inside surface 304 and then inward from the left and the right sides, respectively. A wall 404 (FIG. 4) is formed on rear housing portion 106 and generally extends outward from inside surface 304 in the configuration shown.

Flexible connector 336, which is indeed flexible, includes conductive pads 340 electrically coupled to conductive pads 353 and 338 (positioned thereon) through electrical conductors (not visible). Visual display assembly 320 has a housing provided with tracks 322 and 324 along a left side thereof, tracks 326 and 328 along a right side thereof, and holes 330 and 332 along a top end thereof. Tracks 322 and 326 have catches formed thereon, whereas tracks 324 and 328 do not. Conductive pads 334 are provided on a surface of visual display assembly 320 and are coupled to display circuitry through electrical conductors (not visible).

Front housing portion 104 forms a housing shell having an inside surface 372, an outside surface 374, and a mating perimeter 376 along a top of walls of the housing shell. In the embodiment shown, outside surface 374 forms a substantially planar surface. An L-shaped tab 378 is formed on a left side of front housing portion 104 near and within boundaries of mating perimeter 376. Similarly, an L-shaped tab 380 is formed on a right side of front housing portion 104 near and within boundaries of mating perimeter 376. L-shaped tabs 378 and 380 generally extend outward from inside surface 304 and inward from the left and the right sides, respectively. L-shaped tabs 378 and 380, as well as L-shaped tabs 308 and 310 of rear housing portion 106, may be described as hooks or pliable hooks. Catches 382 and 384 are also formed on the left and the right sides, respectively, near and within boundaries of mating perimeter 376. Catches 382 and 384 generally extend outward from inside surface 372, and each form an opening near inside surface 372.

Slots 315 and 317 are formed on the left side near and within boundaries of mating perimeter 376. Likewise, slots 319 and 321 are formed on the right side near and within boundaries of mating perimeter 376. The top end of front housing portion 104 forms a wall 305, which generally extends from inside surface 372 inward toward a bottom end of front housing portion 104. Slots 307 and 309, and slots 311 and 313, are formed through wall 305 into a cavity formed between wall 305 and inside surface 372.

A display window 387 is formed within boundaries of mating perimeter 376. Slits 388 and 390 are formed on front housing portion 104 adjacent to display window 387. Pins 392 and 394, pins 397 and 399, and walls 301 and 303, generally extend outward from inside surface 304. Openings 122 and 124 are formed on front housing portion 104 and located within ear placement region 120 (FIG. 4).

Display gasket 348 forms a central opening surrounded by notches 350 and 352 and a hole 358 on a left side thereof and by notches 354 and 356 and a hole 360 of a right side thereof. Display lens 126 forms tabs 396 and 398 on a bottom end. Felt 364 has holes 366 and 368 on left and right sides, respectively.

Upper housing 102 may be assembled as follows. Flexible connector 336 is disposed on a surface of visual display assembly 320, where conductive pads 353 are soldered to conductive pads 334, providing an electrical path between visual display assembly 320 and some of conductive pads 340. Similarly, conductive pads 344 of speaker 342 are soldered to conductive pads 338 of flexible connector 336, providing an electrical path between speaker 342 and some of conductive pads 340.

Display lens 126 is positioned and adhesively attached around a mating perimeter 402 (FIG. 4) of front housing portion 104, where tabs 396 and 398 insert within slits 388 and 390, respectively. Magnet 346 is positioned on inside surface 372 (FIG. 3), and eventually secured in place by other elements. Felt 364 is positioned on inside surface 372 so that pins 397 and 399 insert through holes 366 and 368, respectively.

Display gasket 348 is adhesively attached to inside surface 372 around display window 387, where pins 392 and 394 insert through 30 holes 358 and 360, respectively. Visual display assembly 320 is positioned over display window 387 and onto display gasket 348, where catches 382 and 384 slide along tracks 324 and 328, respectively, L-shaped tabs 378 and 380 bend outwardly and slide along tracks 322 and 326, respectively, until locked with the catches of tracks 322 and 326, and pins 392 and 394 insert through holes 330 and 332. An adhesive seal is formed between visual display assembly 320 and display gasket 348. Thus, visual display assembly 320 is secured to front housing portion 104 and adhesively attached to inside surface 372 around display window 387.

Figure 8:
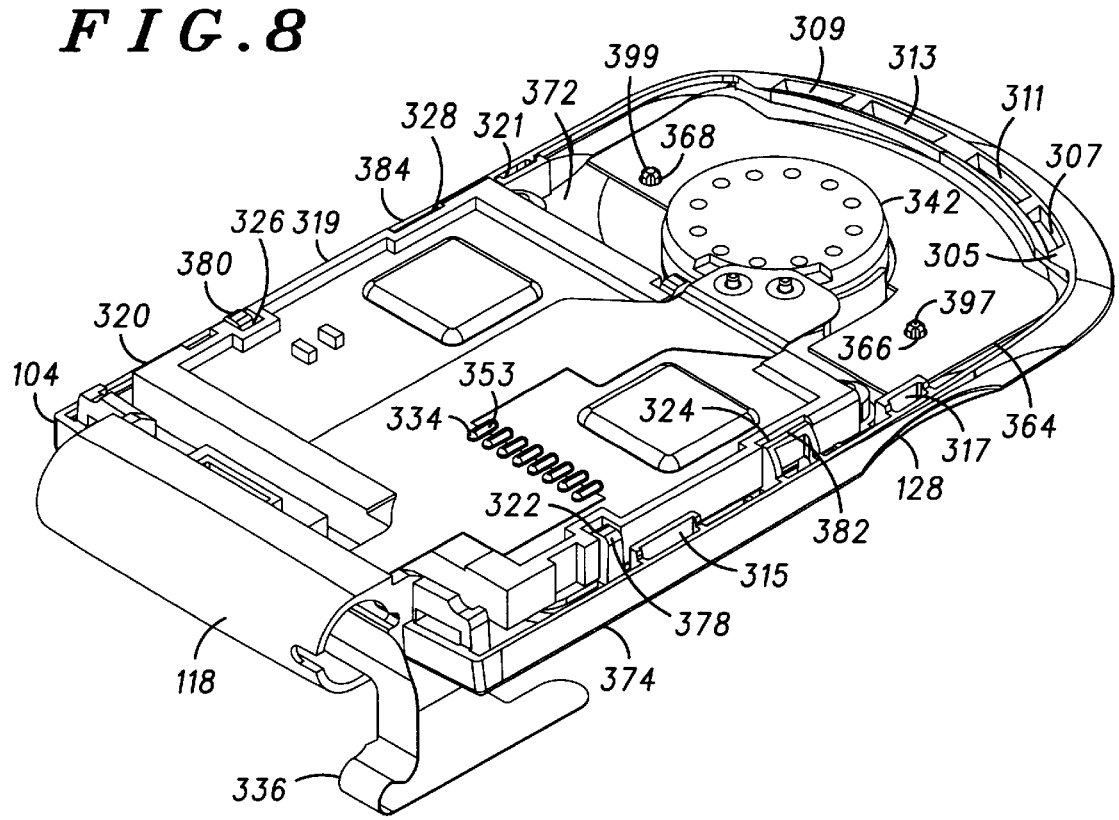
FIG. 8 is a perspective view of a partial assembly of the upper housing.

Together with visual display assembly 320, speaker gasket 362 is adhesively attached to a front outside edge of speaker 342, and speaker 342 is then positioned on inside surface 372 between walls 301 and 303, which partially encircle speaker 342. Here, speaker gasket 362 forms an adhesive seal between speaker 342 and inside surface 372, and a front side of speaker 342 faces and is enclosed around inside surface 372 and opening 122. An end of flexible connector 336 is inserted through an opening in barrel 118. Hinge assembly 370 is loaded within barrel 118. FIG. 8 shows a perspective view of upper housing 102 as partially assembled.

The front end of rear housing portion 106 is positioned toward the front end of front housing portion 104 such that tabs 312 and 314 insert through slots 307 and 309, respectively, and L-shaped tabs 316 and 318 insert through slots 311 and 313, respectively. The bottom end of rear housing portion 106 is tilted toward the bottom end of front housing portion 104 until L-shaped tabs 308 and 310 bend outwardly and slide along catches 382 and 384, respectively, until captured within the openings of catches 382 and 384. Tabs 323 and 325 insert through slots 315 and 317, respectively, and tabs 327 and 329 insert through slots 319 and 321, respectively. Thus, front and rear housing portions 104 and 106 are brought together to form upper housing 102, where mating perimeters 306 and 376 are mated.

Figure 5:
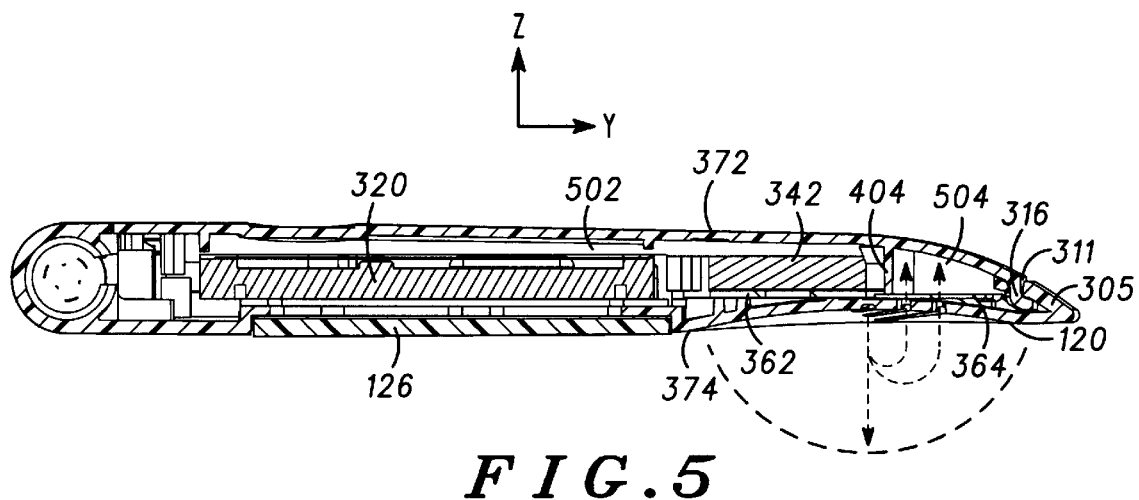
FIG. 5 is a cross sectional view of the upper housing taken along a line 5–5' of FIG. 1.
Figure 10:
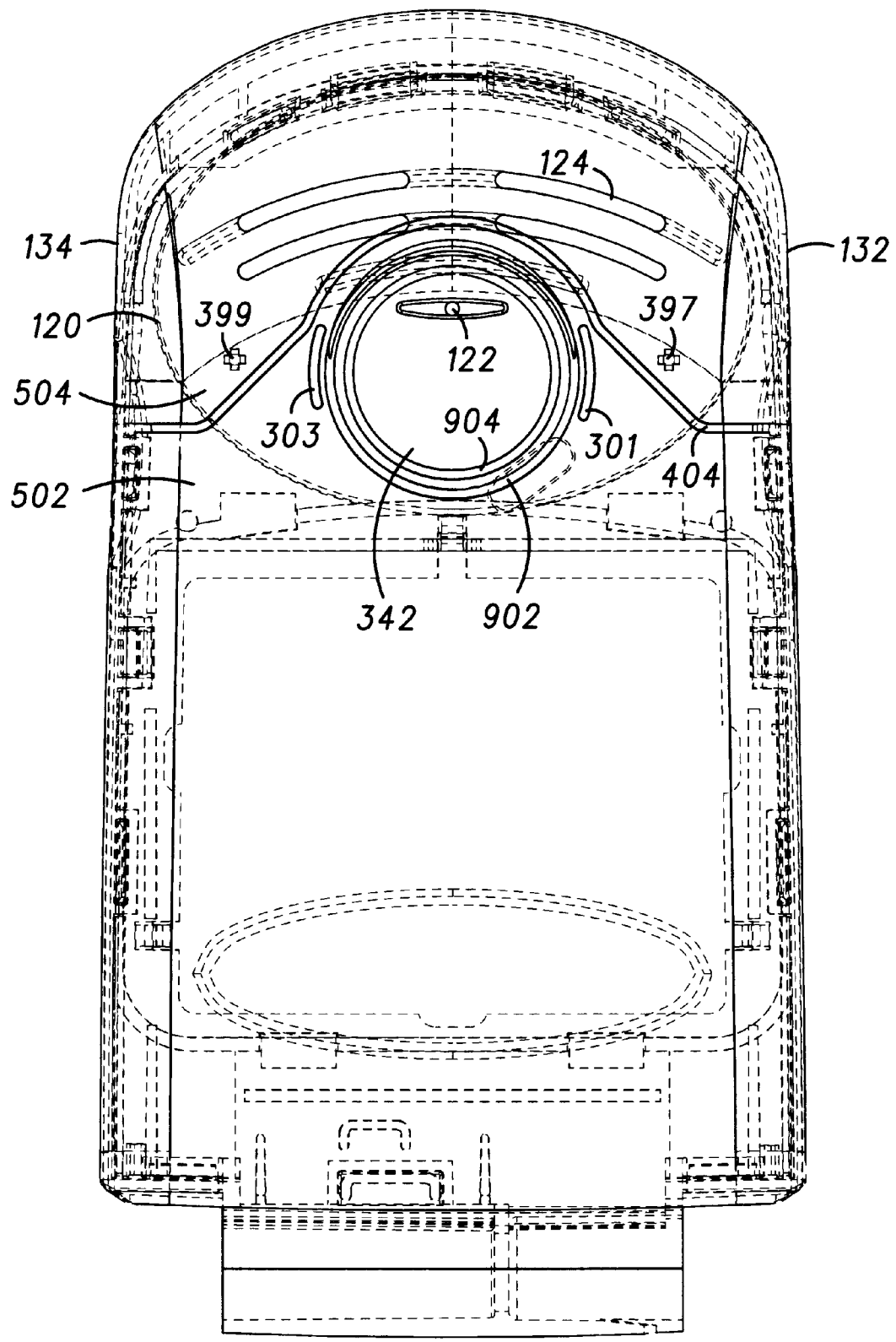
FIG. 10 is a top plan view of the upper housing.

FIG. 5 is a cross-section view of upper housing 102 taken along a line 5–5' of FIG. 1, showing more particularly L-shaped tab 316 inserted through slot 311 of wall 305. This arrangement is representative of that of L-shaped tab 318 and slot 313. L-shaped tab 316 is disposed through slot 311 beneath wall 305, where wall 305 forms part of an outside surface of upper housing 102. FIG. 5 also shows upper housing 102 forming an internal cavity 502 which is substantially separated from an internal cavity 504 by wall 404. FIG. 10 is a plan view of upper housing 102, showing more particularly wall 404 that substantially separates internal cavities 502 and 504.

Figure 6:
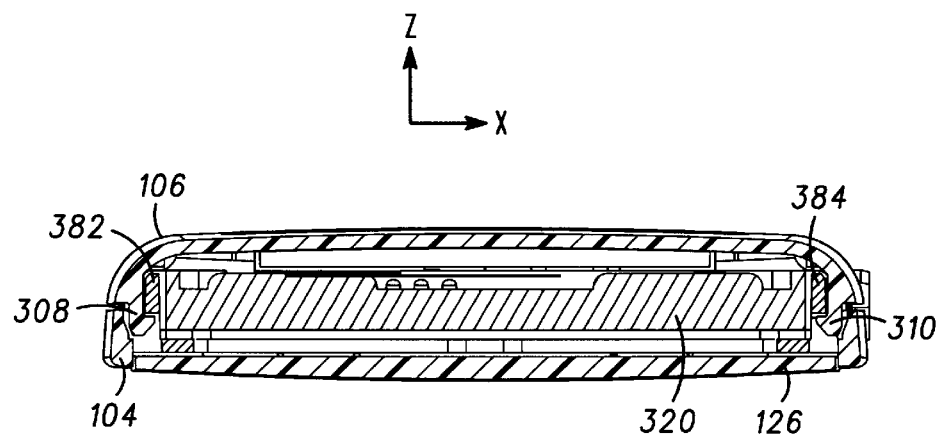
FIG. 6 is a cross sectional view of the upper housing taken along a line 6–6' of FIG. 1.

FIG. 6 shows a cross-section view of upper housing 102 taken along a line 6–6' of FIG. 1, showing more particularly L-shaped tabs 308 and 310 captured within the openings of catches 382 and 384, respectively. This arrangement restricts movement of front housing portion 104 relative to rear housing portion 106 in z-directions.

Figure 7:
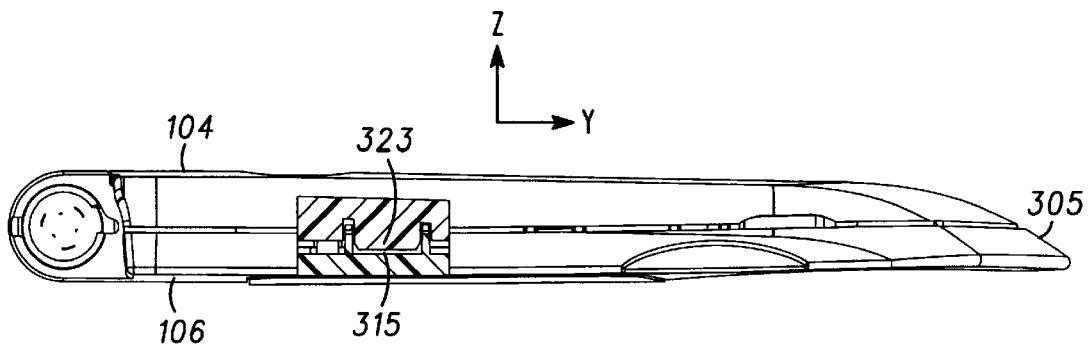
FIG. 7 is a cross sectional view of the upper housing taken along a line 7–7' of FIG. 1.

FIG. 7 shows a cross-section view of upper housing 102 taken along a line 7–7' of FIG. 1, showing more particularly tab 323 inserted and captured within slot 315. Slot 315 is sized to fit tab 323 so that movement between front and rear housing portions 104 and 106 is restricted in directions along mating perimeters 306 and 376 (here in y-directions). Substantial movement may otherwise occur when upper housing 102 is subjected to bending or torsional twisting. The arrangement as shown and described is representative of the insertions of tabs 325, 327, and 329 within slots 317, 319, and 321, respectively.

Provided with such attachments, the housing of portable radiotelephone 100 can better handle physical stresses, such as bending and twisting, and help prevent unintended disassembly. For example, when the top end of upper housing 102 is bent or twisted relative to the bottom end, front and rear housing portions 104 and 106 remain substantially in their assembled positions relative to one another.

Figure 9:
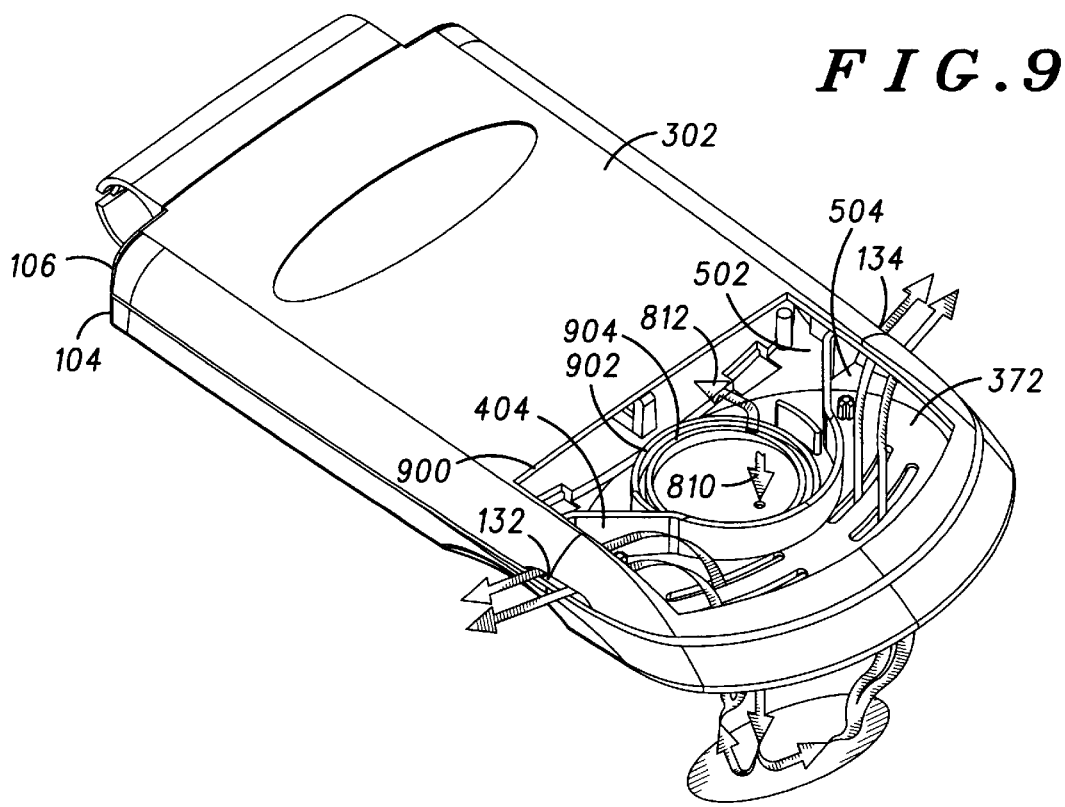
FIG. 9 is a perspective view of a partial assembly of the upper housing with a cutaway.

FIG. 9 shows a perspective view of front and rear housing portions 104 and 106 assembled (without other components) and a cutaway 900 on a portion of outside surface 302. Referring to FIGS. 5, 9 and 10 in combination, opening 122 positioned within ear placement region 120 leads to a front side of speaker 342 through a passage. More particularly, opening 122 leads to a front side of a speaker diaphragm of speaker 342 through the passage. Thus, sound pressure waves from the front side of speaker 342 and the speaker diaphragm are acoustically coupled to an air space (a first air space) formed in front of ear placement region 120 through the passage having opening 122. A rear side of speaker 342 has openings formed on a basket (see FIG. 8) which carries the speaker diaphragm. Sound pressure waves from a rear side of speaker 342 and the speaker diaphragm are acoustically coupled to internal cavity 502 (a second air space) through the openings of the speaker basket.

Opening 124, which is also positioned within ear placement region 120, leads to internal cavity 504 through a passage. (The other plurality of additional openings lead to internal cavity 504 as well.) Thus, the air space in front of ear placement region 120 is acoustically coupled to internal cavity 504 (a third air space) through the passage having opening 124. Openings 132 and 134, which are positioned outside of ear placement region 120, lead to internal cavity 504 through passages as well. Thus, internal cavity 504 is acoustically coupled to open air (a fourth air space), an air space away from ear placement region 120.

During use of portable radiotelephone 100, an ear volume (e.g., designated by dashed lines in FIG. 5) is formed between ear placement region 120 and a human ear. The ear volume, which may be formed by a completely or partially enclosed seal, includes the air space formed in front of ear placement region 120. Here, sound pressure waves from the front side of speaker 342 are acoustically coupled to the ear volume through the passage having opening 122. The ear volume is also acoustically coupled to internal cavity 504 through the passages having the plurality of additional openings (e.g., opening 124).

Referring more specifically to FIG. 9, a sound pressure wave flow 810 is representative of sound pressure wave flow from the front side of speaker 342 and the speaker diaphragm when audio signals are generated and the ear volume is formed between ear placement region 120 and the ear of a user. As shown by sound pressure wave flow 810, sound pressure waves are directed through a passage and out of opening 122 where it reaches the ear volume. Some of the sound pressure waves enter into the ear of the user. Some of the sound pressure waves are forced into the plurality of additional openings (e.g., opening 124) and through passages (and also through felt 364, not shown in FIG. 9) into internal cavity 504. The sound pressure waves are then forced through openings 132 and 134 and outside of upper housing 102 to open air. A sound pressure wave flow 812 is representative of sound pressure wave flow from a rear side of speaker 342 when audio is present. As shown by sound pressure wave flow 812, sound pressure waves are directed from the rear side of speaker 342 and the speaker diaphragm into internal cavity 502.

FIG. 11 shows a graph 1100 of acoustic frequency response curves 1102 and 1104 from a conventional portable radiotelephone using a dynamic type speaker with a low free air fundamental resonant frequency. Each of acoustic frequency response curves 1102 and 1104 show an acoustic sound pressure level versus frequency. More specifically, acoustic frequency response curve 1102 was obtained where an earcup of the conventional portable radiotelephone was sealed to an artificial ear (IEC-318 type, not shown). Acoustic frequency response curve 1104 was obtained where the earcup was unsealed using a leakage ring adapter (not shown) in conjunction with the artificial ear. As acoustic frequency response curve 1102 reveals, an undesirable bass boost is present in the sealed condition.

FIG. 12 shows a graph 1200 of acoustic frequency response curves 1202 and 1204 of portable radiotelephone 100. Graph 1200 was obtained using methods similar those described in relation to FIG. 11. More specifically, acoustic frequency response curve 1202 was obtained where ear placement region 120 was sealed to the artificial ear, and acoustic frequency response curve 1204 was obtained where ear placement region 120 was unsealed using the leakage ring adapter. As acoustic frequency response curves 1202 and 1204 reveal, no substantial bass loss or boost occurs in the sealed condition using portable radiotelephone 100. Acoustic frequency response curve 1202 is substantially the same as acoustic frequency response curve 1204. Portable radiotelephone 100 thus provides an acoustic frequency response that is substantially independent of a seal around ear placement region 120. (These results should be compared with the results from the conventional portable radiotelephone in FIG. 11.)

Figure 13:
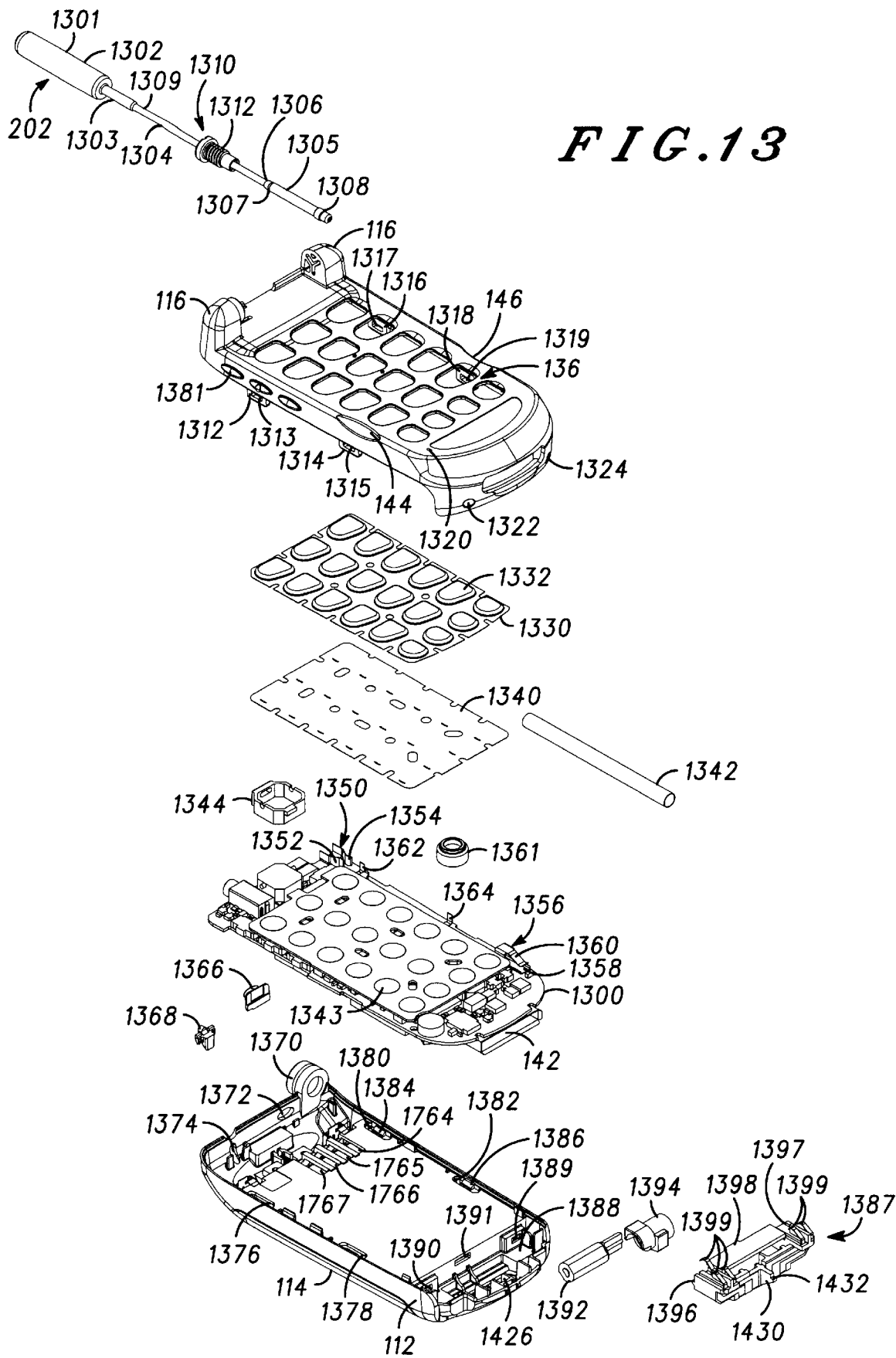
FIG. 13 is an exploded view of the lower housing as viewed from the top, front and right side.
Figure 14:
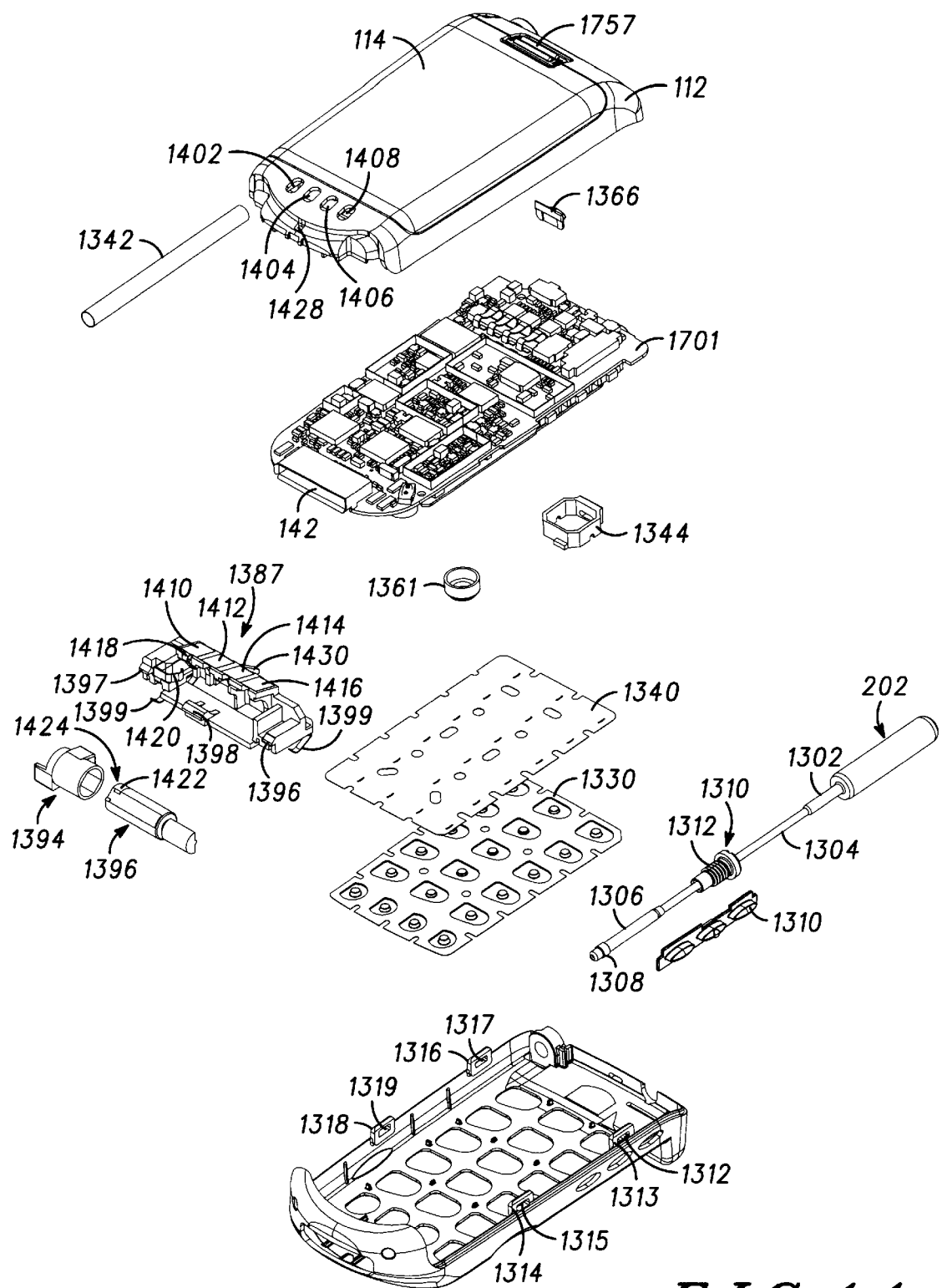
FIG. 14 is an exploded view of the lower housing as viewed from the top, front and right side.

Turning now to FIG. 13, an exploded perspective view shows the lower housing 108 according to the present invention. In particular, an antenna 202 adapted to be coupled to the lower housing has a top portion 1301. The top portion is covered by a sleeve 1302 having a lower sleeve portion 1303. Top portion 1301 is also connected to a whip portion 1304 which extends to a movable contact 1306 having an upper contact portion 1305, a shoulder portion 1307 and a flange 1308. A coupling location 1309 located below lower sleeve portion 1303. The antenna also includes a bushing 1310 having threaded portion 1312. The coupling of the antenna will be described in more detail in reference to FIG. 15, and the structure of the antenna will be described in more detail in reference to FIG. 16.

Front housing portion 110 further includes a hoop 1312 having a recess 1313, a hoop 1314 having a recess 1315, a hoop 1316 having a recess 317, and a hoop 1318 having a recess 1319. As will be apparent, the hoops are designed to intermate with snaps of lower housing 112. Front housing portion 110 further includes a microphone port 1320 and recesses 1322 and 1324 for receiving a detachable battery which will be described in more detail in the remaining figures. A keypad 1330 having keys 136 is shown below front housing portion 110. A mylar sheet 1340 having poppies fits between the keypad and keyboard 1343. An alert device grommet 1344 fits over an alert device 1346. Transceiver board 1300 also includes an upper contact 1350 having a first contact element 1352 and a second contact element 1354, and a lower contact 1356 having a lower contact portion 1358 connected to the transceiver board and an upper contact portion 1360. A microphone grommet 1361 covers a microphone 1363 attached to transceiver board 1300. The transceiver board also includes antenna tube clips 1362 and 1364 for retaining antenna tube 1342. A button 1366, for activating a feature such as a memo recording feature of the device, and a light pipe 1368 are inserted into recesses 1372 and 1374 respectively of the rear housing portion 112. The rear housing portion includes an antenna receptacle 1370 having a threaded portion for receiving threaded portion 1311 of portion 1310.

The rear housing portion 112 further includes recesses 1376, 1378, 1380, and 1382. Snaps 1384 and 1386 extend through recesses 1380 and 1382 respectively. The snaps 1384 and 1386 engage hoops 1316 and 1318 respectively. Similar snaps are located within recesses 1376 and 1378, but are not visible.

A contact block 1387 is adapted to fit in a well 1388 having recesses 1389, 1390, and 1391. A vibrator 1392 and an associated grommet 1394 fits within a recess 1401 of contact block 1387. Recesses 1402, 1404, 1406, and 1408 enable access to contacts 1410, 1412, 1414, and 1416 respectively of the contact block. A contact portion 1418 and contact portion 1420 of the contact block are adapted to extend into recess 1401 to make contact to vibrator 1392 when the vibrator and grommet 1394 are inserted into contact block 1387. In particular, a first contact 1424 on the end of the vibrator and a second contact 1422 associated with the outer housing of the vibrator are coupled to contacts 1420 and 1418 respectively. Finally, contact block 1387 is inserted into well 1388 by inserting a flange 1430 into a hook 1434 in the lower housing. Snaps 1396, 1397, and 1398 are then inserted into recesses 1389, 1390, and 1391 respectively as the contact block is pivoted into the well.

Figure 15A:
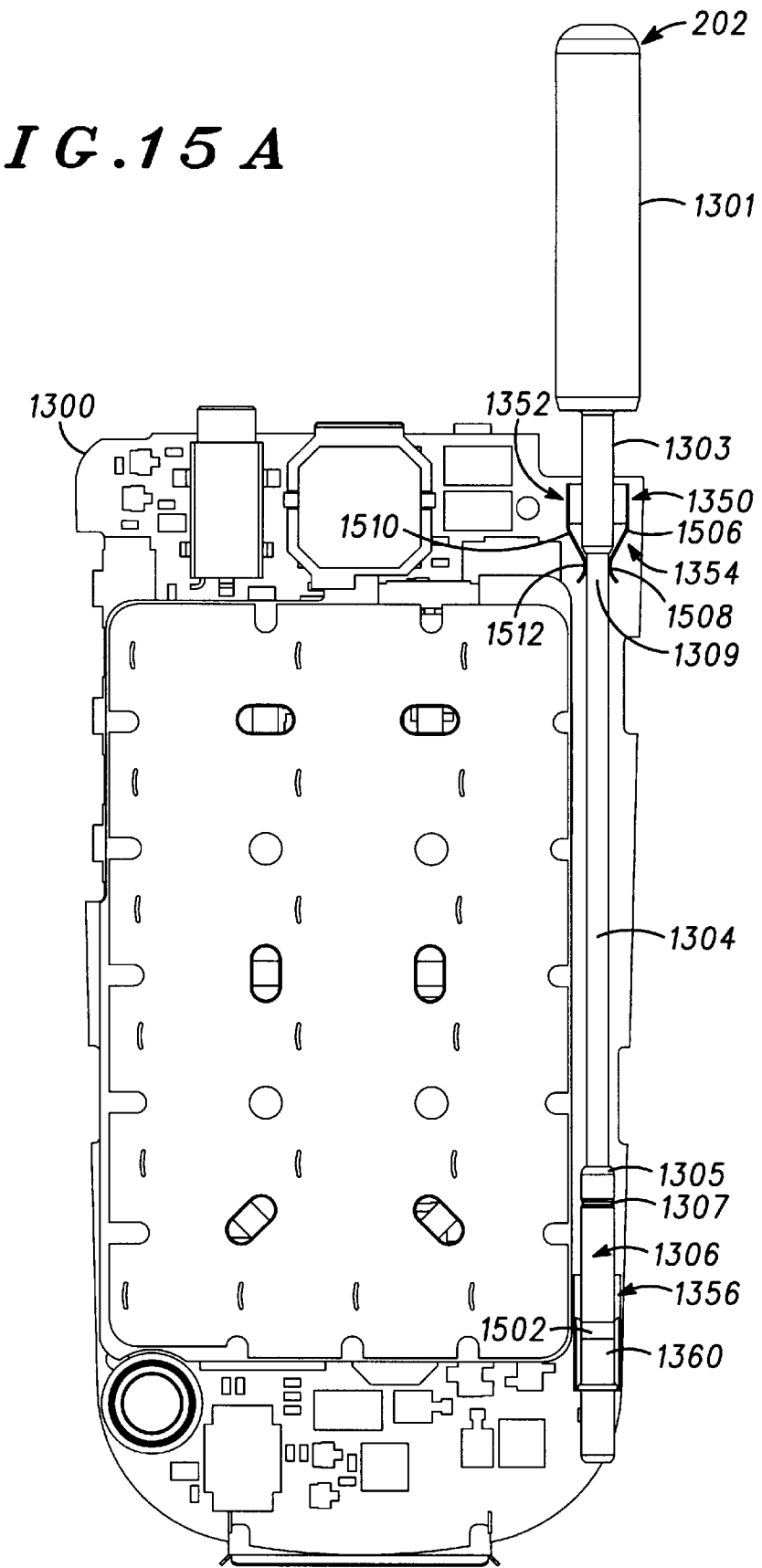
FIG. 15-A is a top plan view of showing an antenna in the down position attached to a transceiver board according to the present invention.
Figure 15B:
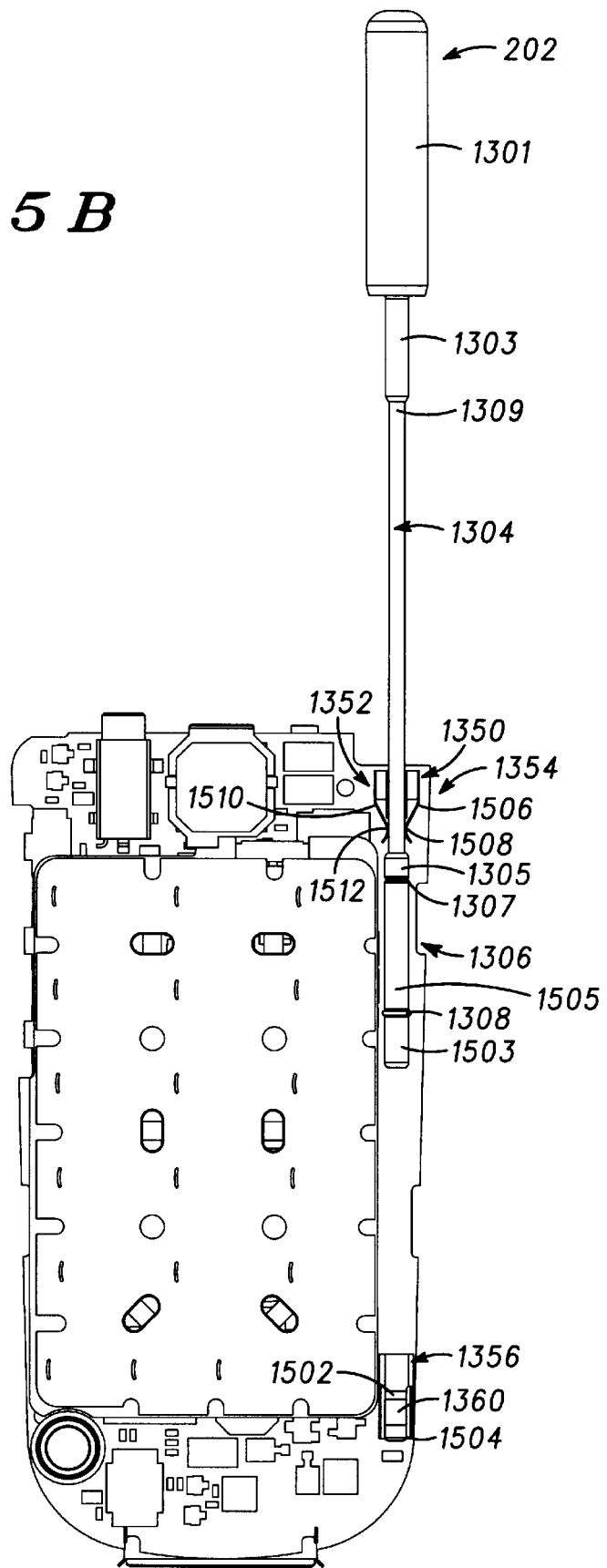
Figure 15C:
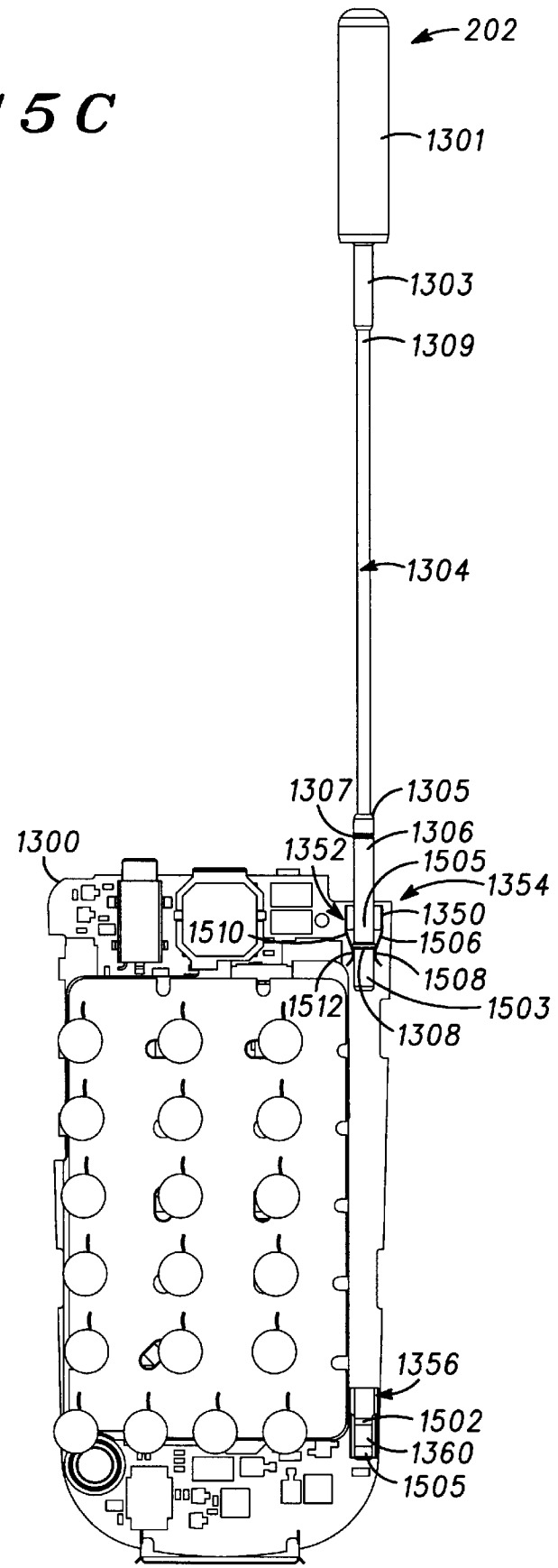
Figure 16A:
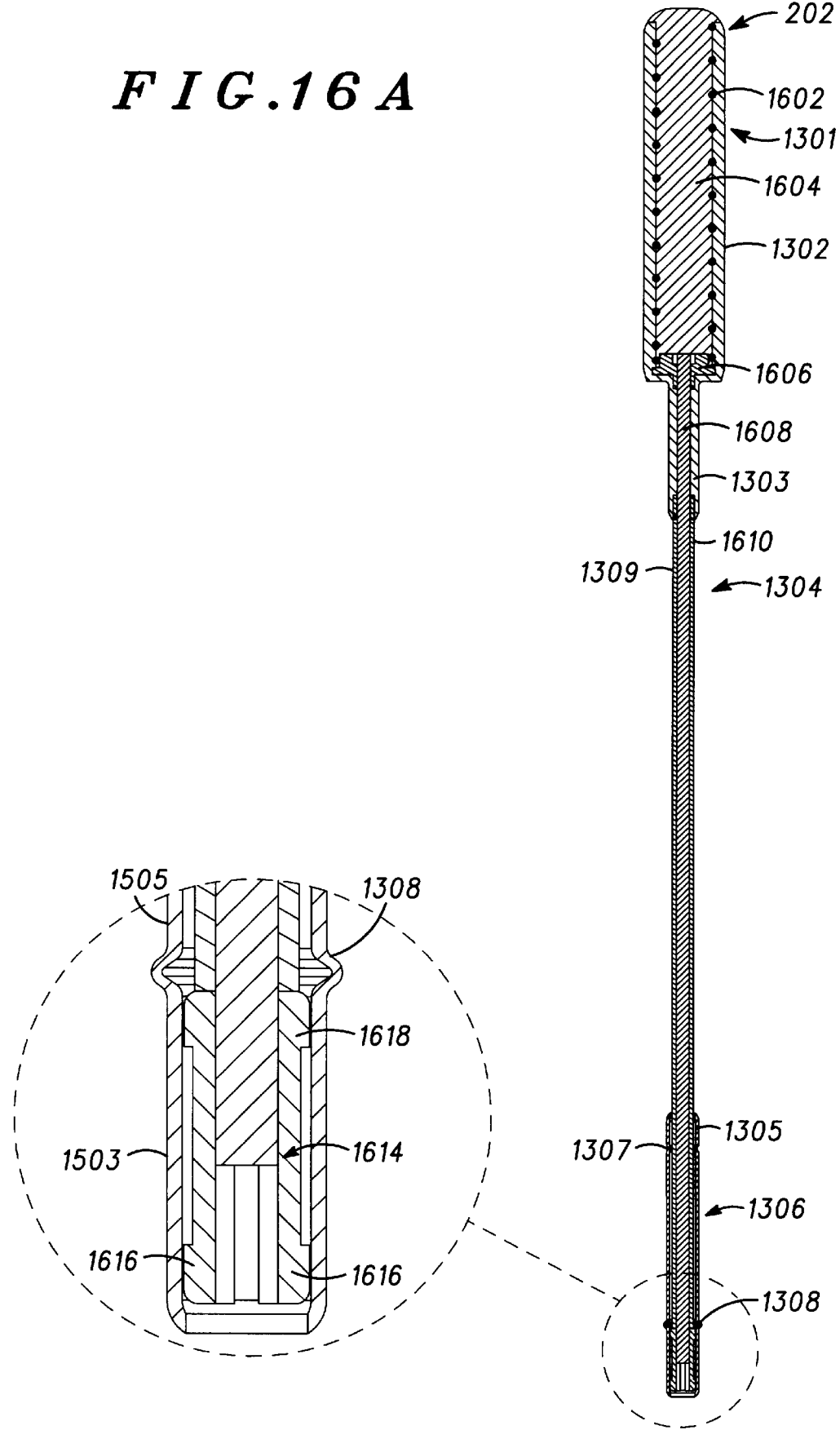
FIG. 16-A is cross-sectional view of an antenna having a movable contact in a first position according to the present invention.
Figure 16B:
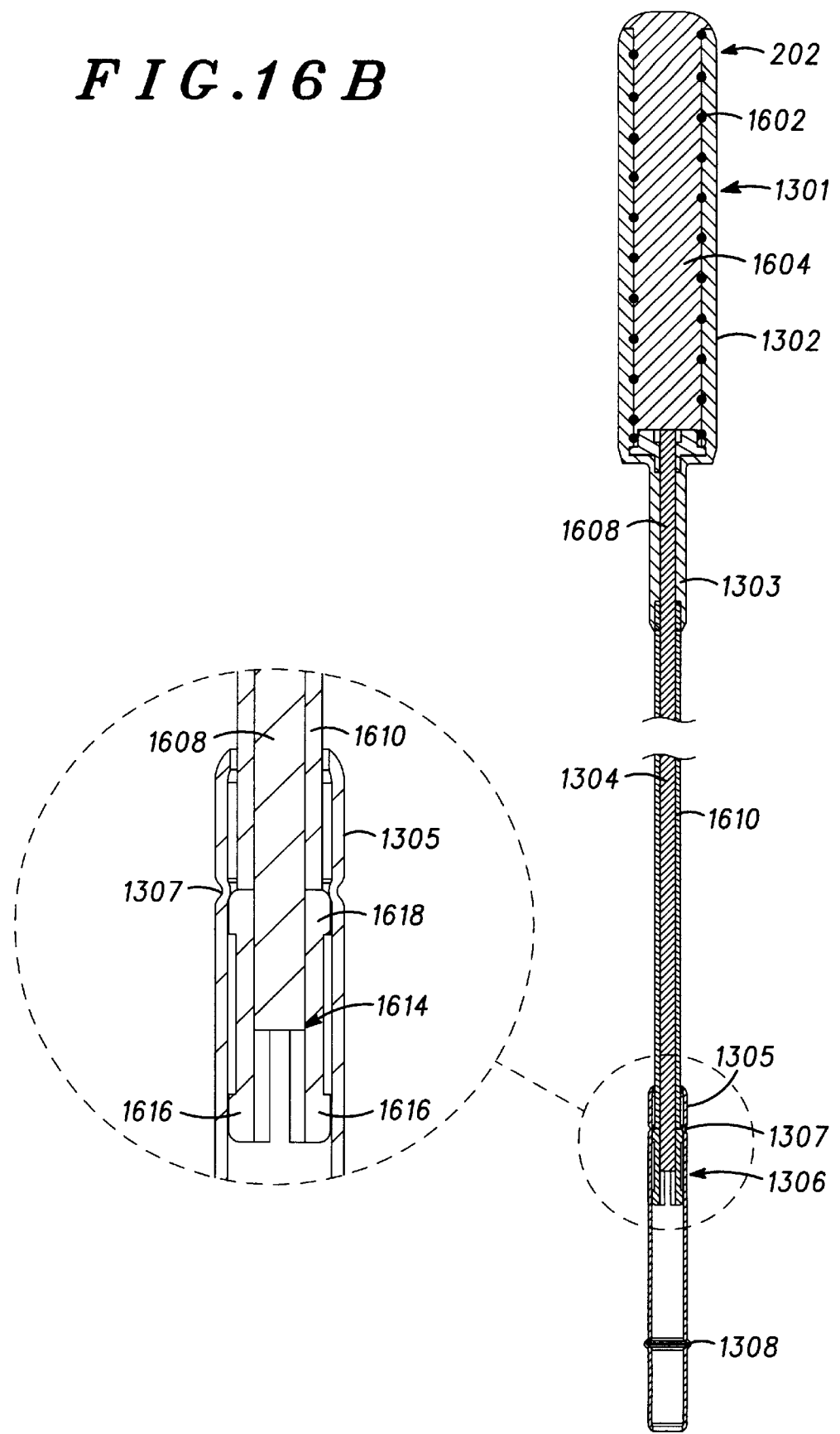

Turning now to FIGS. 15–16, the coupling of antenna 202 to transceiver board 1300 is described. A radio circuit, matching circuit, ground plane, and other elements can be disposed on transceiver board 1300. A radio circuit can be, e.g., a duplexer, a transmitter, a receiver, a modulator, a demodulator, or traces connecting the components of the radio circuit, or some combination of these components and traces. A matching circuit is preferably coupled between feed terminal 236 and the radio circuit. The matching circuit can be, for example, a T-connected circuit with a capacitor C in one arm, an inductor $L_1$ in the other arm, and a ground-terminated inductor $L_2$ in the leg.

Antenna 202 is generally a compound antenna having a first antenna portion, e.g., at least a helical coil within top portion 1301, and a second antenna portion, e.g., at least a portion of the rod portion 1304. The first antenna portion is carried by the second antenna portion and can be electrically coupled, e.g., by direct electrical contact, to the second antenna portion. As will be described in more detail in the remaining FIGURES, antenna 202 is moveable between a retracted position and an extended position, and a movable contact 1306 is located near the bottom of rod portion 1304.

Antenna 202 has many parameters representative of the position of the antenna, the physical location of antenna relative to a housing or feed terminal, the electrical impedance of antenna, or the strength of the electrical signal that the antenna receives. Those skilled in the art will recognize that various modifications and variations, in addition to those already described, can be made in the radiotelephone of the present invention and in construction of this radiotelephone without departing from the scope or spirit of this invention. As examples, the demarcation between the first antenna portion and the second antenna portion can be defined by an area where feed terminal 1350 couples with the antenna in the retracted position. Accordingly, the first antenna portion can be any part of rod portion 1304, or all of rod portion 1304 and a part of helical coil 1602. Furthermore, the first antenna portion and second antenna portion can be radiating elements of different shapes. Also, instead of the second antenna portion being a quarter wavelength, ground terminated and adjacent a ground plane, it can be of a different wavelength, terminated with an impedance, or surrounded by a conductive tube that is grounded. Also, the feed contact and bushing can be the same component, and the feed contact, or the ground contact can be disposed on the housing or a component inside the housing.

FIG. 15-A particularly shows antenna 202 in the down position attached to transceiver board 1300. In the down position, movable contact 1306 is in contact with ground terminal 1356. In particular, ground terminal 1356 includes a bend 1502 and a contact portion 1504 for making an electrical connection to movable contact 1306 at a ground location 1505 above flange 1308. When antenna 202 is in the retracted position, movable contact 1306 is also in the retracted position. In the retracted position, the first antenna portion is located substantially outside of the housing, and the second antenna portion is located inside the housing and in close proximity to a ground plane on transceiver board 1300. Further, feed terminal 1350 is electrically coupled, e.g., either in direct electrical contact or capacitively coupled, with a second coupling location 1309 of the antenna, e.g., the lower end of the first antenna portion, and ground terminal 238 is electrically coupled, e.g., in direct electrical contact, with first coupling location 245.

As the antenna is moved upward, the movable contact is advanced towards feed terminal 1350 as shown in FIG. 15-B. As the antenna is advanced further upward, the movable contact comes in contact with the feed terminal 1350, until it is fully extended as shown in FIG. 15-C. In the extended position the first antenna portion and the second antenna portion are located substantially outside of the housing. Further, a first coupling location 1503 of the antenna, e.g., the lower end of movable contact 1306, is electrically coupled, e.g., in direct electrical contact, with feed terminal 1350. That is, when the antenna is fully extended as shown in FIG. 15-C, the movable contact is also fully extended, as shown in FIG. 16-B.

Depending upon the friction force of the movable contact (described in more detail in FIG. 16-A) and the spring forces of first and second contact elements 1352 and 1354 of the feed terminal 1350 and of upper contact portion 1360 of ground terminal 1356, the top portion 1301 will extend further relative to the movable contact as the rod portion extends through the movable contact. That is, the spring pressure of upper contact portion 1360 of ground terminal 1356 and the first and second contact elements of feed terminal 1350 can be selected to enable the movable contact to be extended when in the down position as the antenna is initially advanced upward, or after the antenna has advanced and the movable contact has made contact with the upper contact, or a combination of both. Alternatively, the spring forces of the contacts and the friction force of the movable contact can be chosen such that the movable contact is not moved with respect to the rod portion until flange 1308 of movable contact makes contact with bushing 240 and the antenna is advanced to the fully extended position.

Turning now to FIG. 16, FIG. 16-A shows an antenna with movable contact 1306 in a collapsed position (when the antenna is in the down position or before the antenna is fully extended). As shown in the cross-sectional view of FIG. 16-A, a helical coil 244 is positioned within top portion 1301 of the antenna. The helical coil surrounds a dielectric material 1604, which provides support for the helical coil. The sleeve 1302 surrounds the helical coil and dielectric material and extends around a contact 1602 which connects the helical coil with an antenna element 1608. Sleeve 1302 extends to a lower sleeve portion 1303 below the top portion 1301. A sleeve 1610 extends below lower sleeve portion 1303 and covers antenna element 1608.

An enlarged view of movable contact 1306 shows a pair of contacts 1614 having contact portions 1616 which make an electrical contact between antenna element 1608 and movable contact 1306. Preferably, four contacts are evenly spaced around the rod, although any number of contacts could be employed. Each contact 1614 also includes a flange 1618 which stops the movement of the movable contact downward, as shown in FIG. 16-B. In particular, as the movable contact is moved downward by the force of either feed terminal 1350, ground terminal 1356 or bushing 240, each flange 1618 abuts shoulder portion 1307, preventing any further movement of the movable contact. As is apparent in FIG. 16-B, contact portion 1616 makes an electrical contact to movable contact 1306 at a location near the top of movable contact 1306, effectively extending the length of the antenna.

Also shown in FIGS. 16-A and 16-B is an upper portion 1305 which is included to minimize the movement of the movable contact when the movable contact is fully extended as shown in FIG. 16-B, such as when the antenna is bent. As stated earlier, flange 1308 prevents the antenna from being removed from the radiotelephone when bushing 240 is screwed into antenna receptacle 1370.

Figure 17:
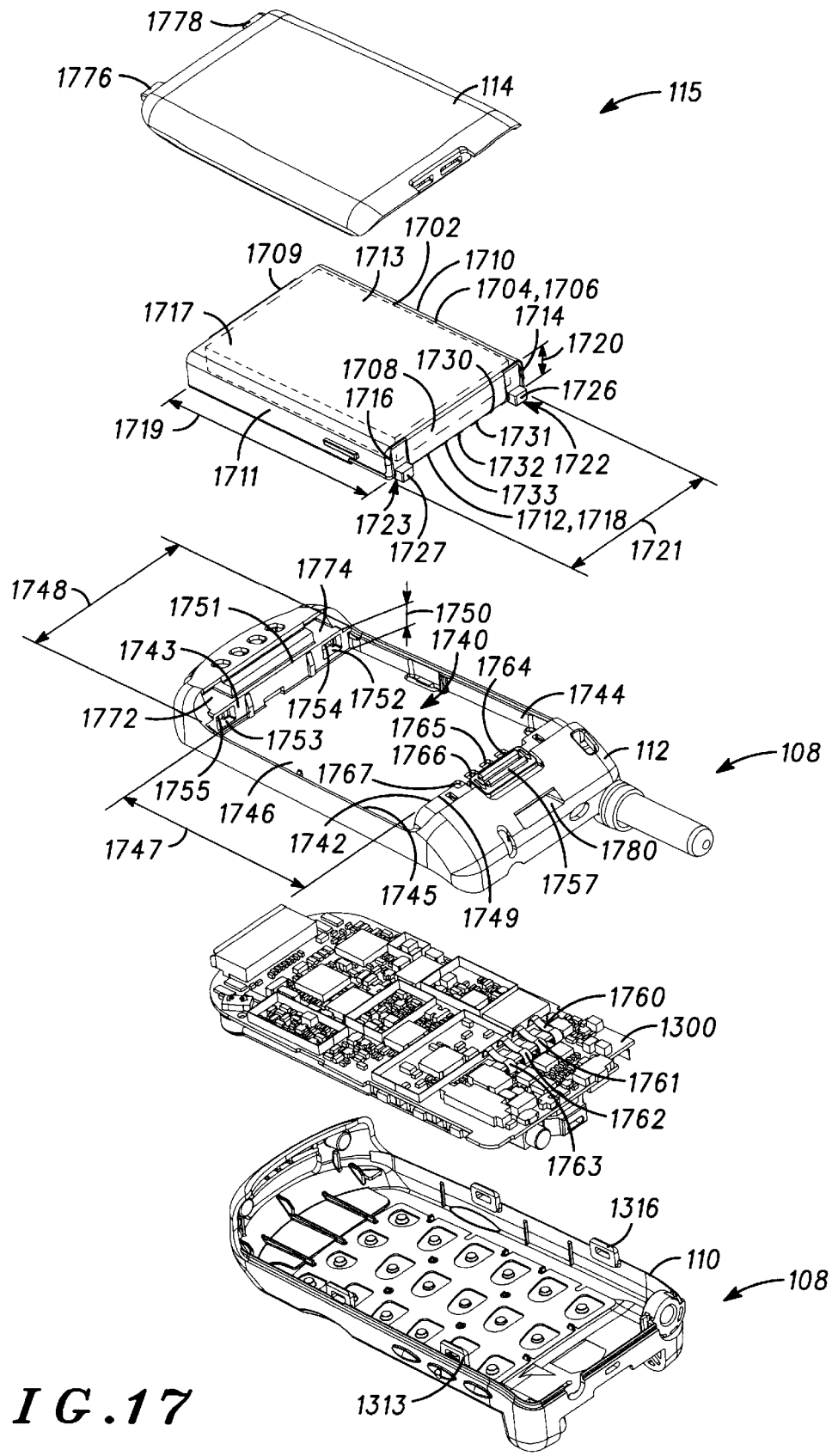
FIG. 17 is an exploded rear, left side and top perspective view of a lower housing of the portable radiotelephone of FIG. 1 showing a battery connection apparatus embodied in, all or part of, a cover, a battery pack, a rear housing portion, the transceiver board and the front housing portion.
Figure 22:
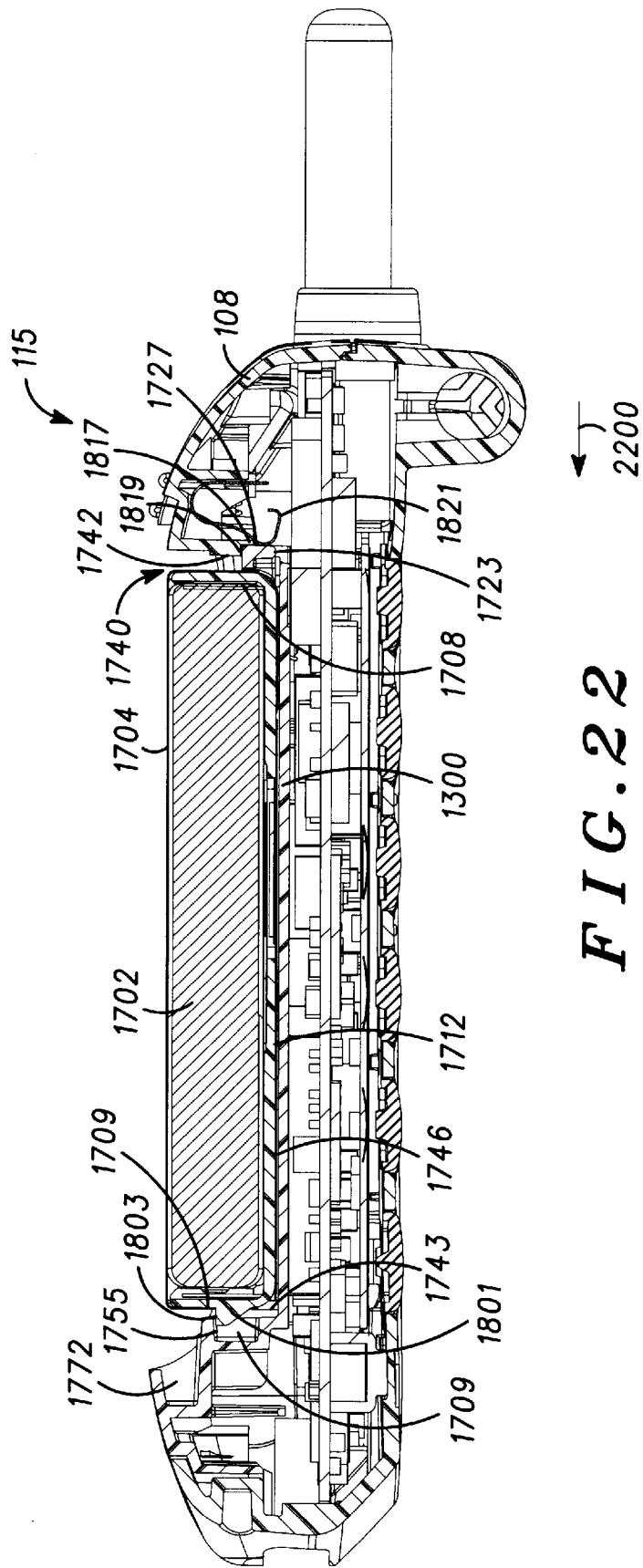
FIG. 22 is a first cross-sectional view of the battery pack received by the lower housing taken across section lines 22—22 in FIG. 21.
Figure 23:
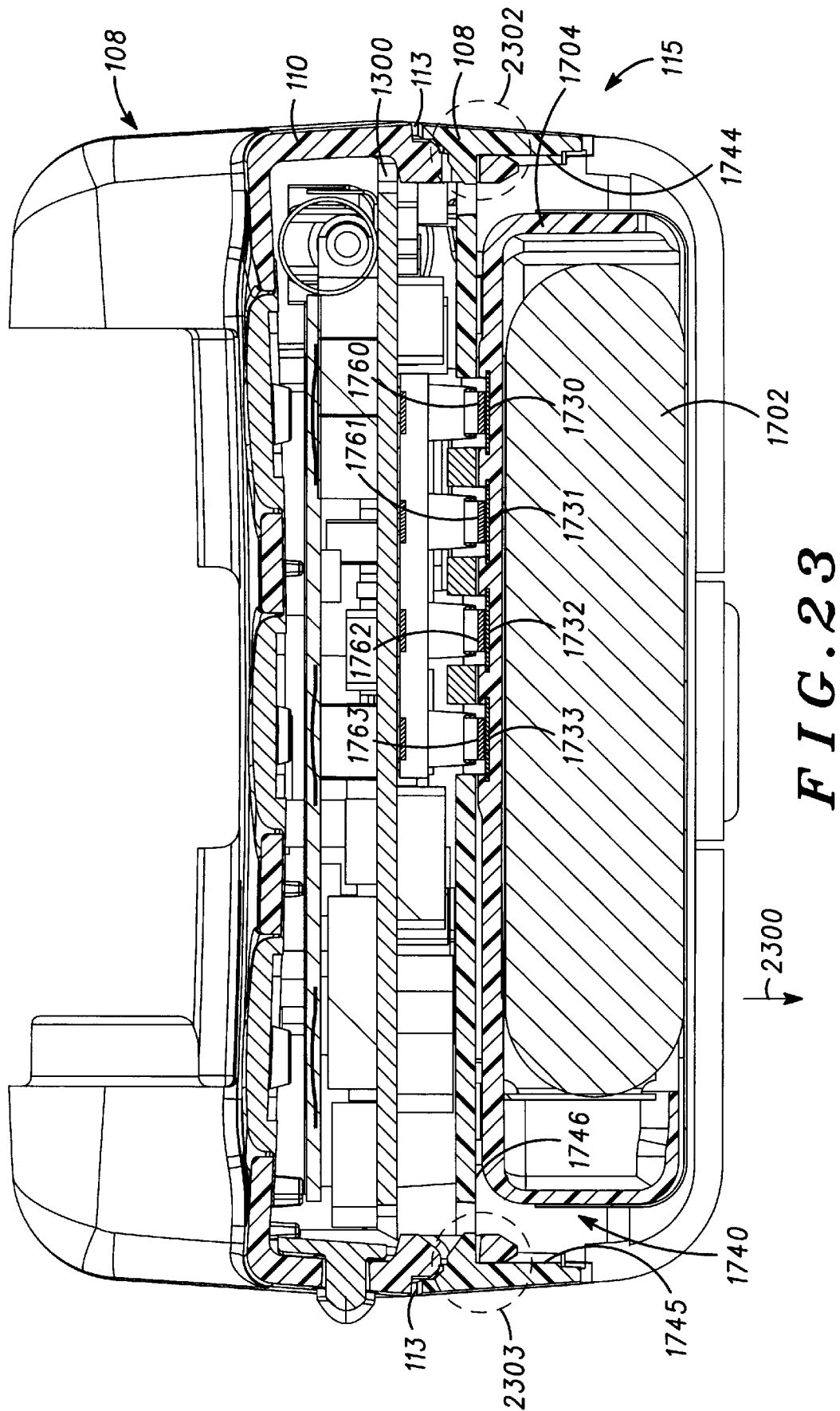
FIG. 23 is a second cross-sectional view of the battery pack received by the lower housing taken across section lines 23—23 in FIG. 21.

The battery 1702, which is illustrated in dotted lines in FIG. 17 and shown in full lines in FIGS. 22 and 23, is contained within a battery pack 1704 of the battery connection apparatus 115. The battery 1702 is of a substantially standard rectangular solid shape that is closely conformed to by a housing 1706 of the battery pack 1704 that surrounds the battery 1702. Housing 1706 has a tray portion that is molded from polycarbonate or other suitable material to have front and rear ends 1708 and 1709; a right side 1710 extending between, and orthogonal to, the ends 1708 and 1709 and joining end 1708 at edge 1714; a left side 1711 extending between, and orthogonal to, the ends 1708 and 1709 and joining end 1708 at edge 1716; and a bottom surface 1712 extending between, and orthogonal to, the ends and sides 1708–1711 and joining end 1708 at edge 1718. The tray portion receives and supports the battery 1702. An adhesive label 1717, which defines a top surface 1713 of housing 1706, covers the battery 1702 and partially over wraps the ends, sides and surface 1708–1712. The adhesive label 1717 is die cut from mylar or other suitable material. The battery 1702 and housing 1706 are thin, as exemplified by the surfaces 1712 and 1713 having a substantially larger area than any one of the ends and sides 1708–1711. In a preferred embodiment, a height 1720 of end 1708 (and end 1709) is approximately 7 mm; a length 1721 of end 1708 (and end 1709) (i.e., the width of housing 1706) is approximately 35 mm; and a distance 1719 between the ends 1708 and 1709 (i.e., the length of surface 1712 and length of housing 1706) is approximately 50 mm.

Figure 18:
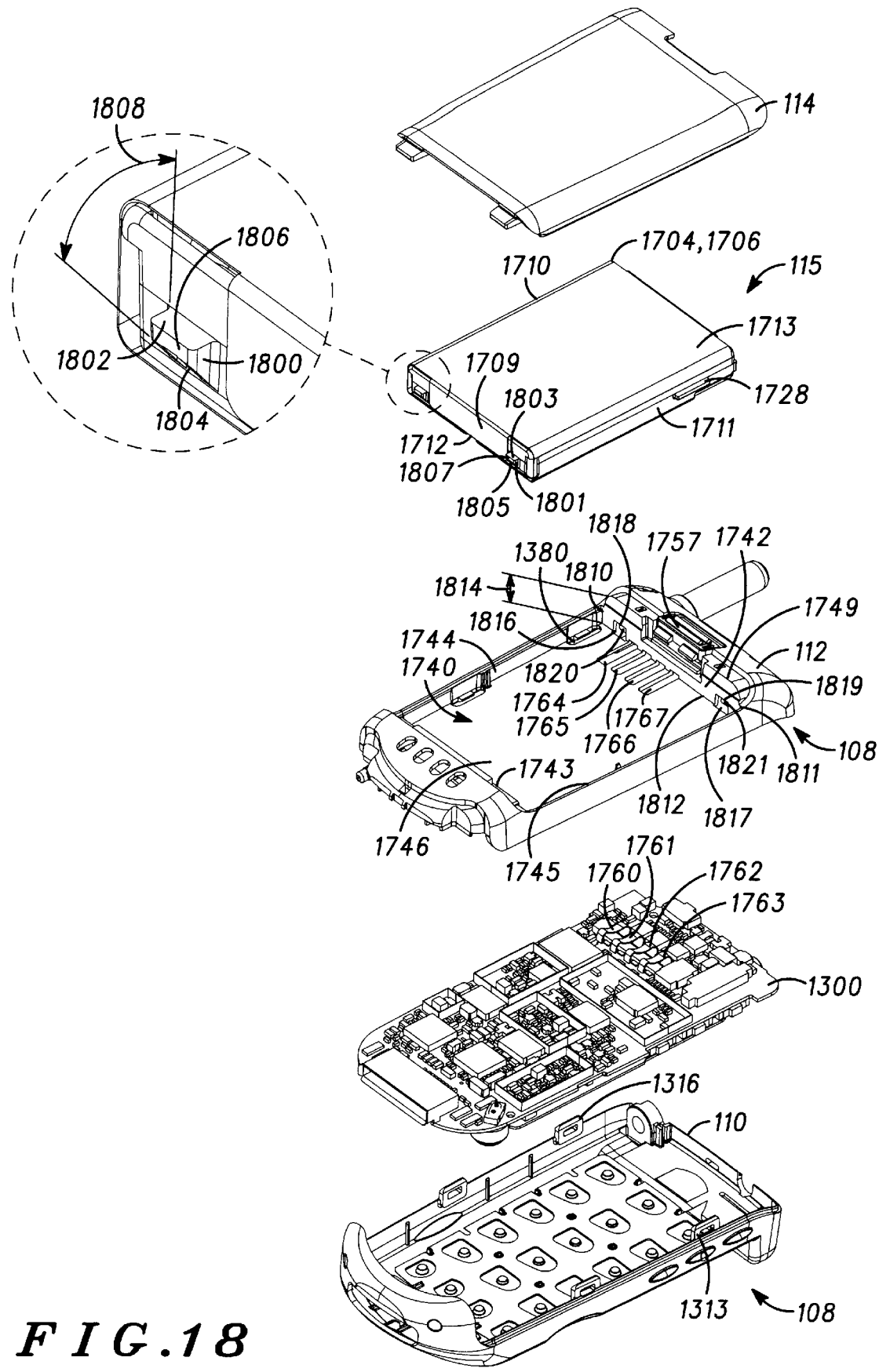
FIG. 18 is an exploded rear, left side and bottom perspective view of the lower housing of the portable radiotelephone of FIG. 1 showing the battery connection apparatus of FIG. 17, a portion of the battery pack shown using an enlargement window.
Figure 19:
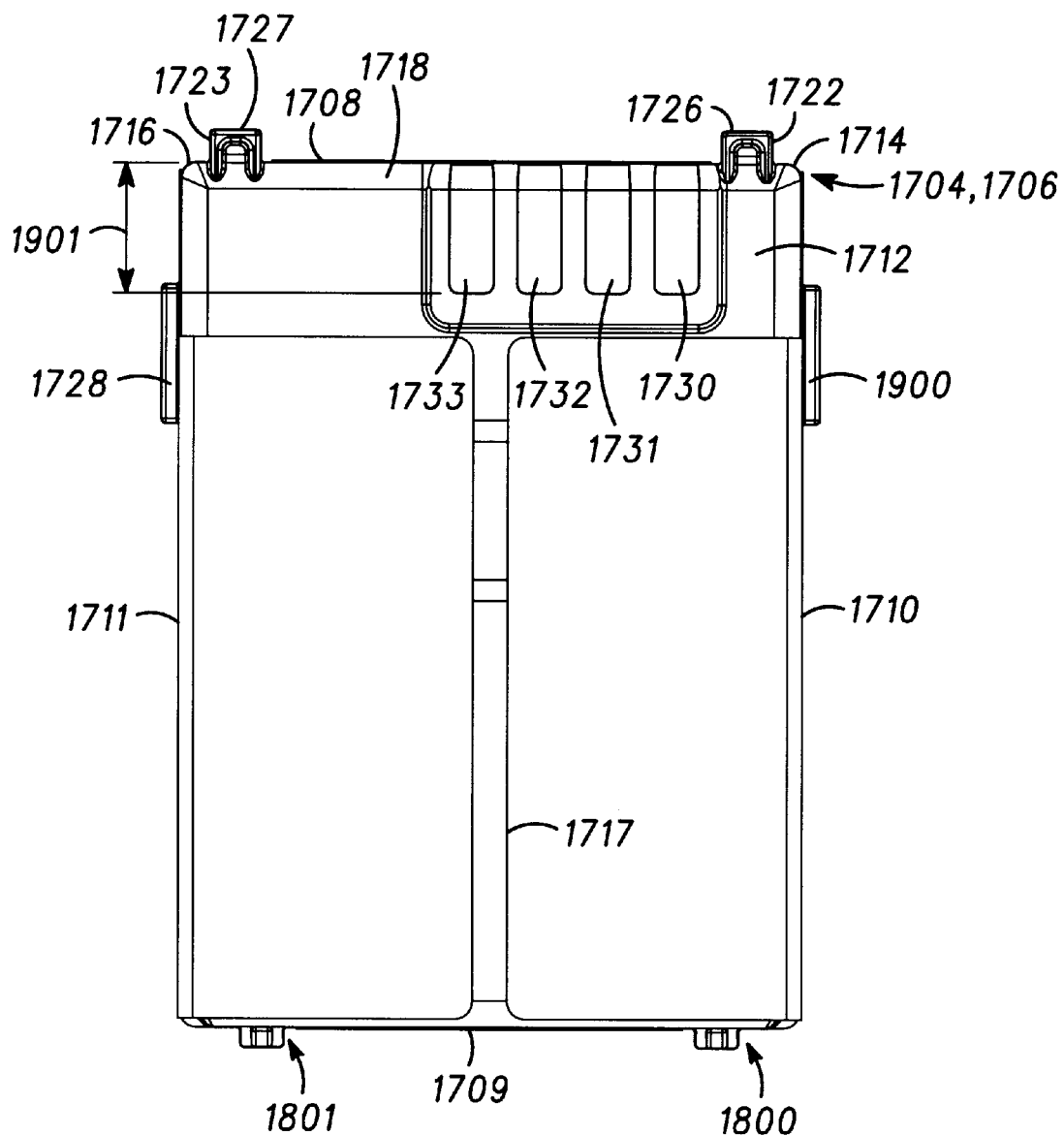
FIG. 19 is a bottom plan view of the battery pack of FIG. 17.

The battery pack 1704 has mating projections 1722, 1723, 1800 and 1801, as shown in FIGS. 17–19, carried on housing 1706. Projections 1722 and 1723 are located on end 1708 at edge 1718 to extend coplanarly with surface 1712. Projection 1722 is further located on the right half of end 1708 (i.e., between the middle of end 1708 and edge 1714), such as about 1 mm from edge 1714. Projection 1723 is further located on the left half of end 1708 (i.e., between the middle of end 1708 and edge 1716), such as about 1 mm from edge 1716. Projections 1722 and 1723 have respective distal ends 1726 and 1727 with substantially flat, rectangular surfaces parallel to end 1708. In the illustrated embodiment, each of the distal ends 1726 and 1727 are about 3 mm wide, about 2 mm tall and about 1.85 mm from end 1708.

Projections 1800 and 1801 are located on left and right halves of end 1709, respectively, such as about 4 mm from the sides 1710 and 1711, respectively. Projections 1800 and 1801 have respective top surfaces 1802 and 1803 that are parallel to surfaces 1712 and 1713 of housing 1706, and respective bottom surfaces 1804 and 1805 that are angled with respect to end 1709 of housing 1706. A distal end 1806 of projection 1800 is formed from convergence of top and bottom surfaces 1802 and 1804, and a distal end 1807 of projection 1801 is formed from convergence of top and bottom surfaces 1803 and 1805. Distal ends 1806 and 1807 are smaller in area than distal ends 1726 and 1727 of projections 1722 and 1723. In the illustrated embodiment, the bottom surfaces 1804 and 1805 form an angle 1808, which is preferably 35 degrees but can alternately be anywhere between 30 degrees and 70 degrees, with respect to end 1709 of housing 1706; and distal ends 1806 and 1807 are about 2 mm wide and about 1.2 mm from end 1709.

One skilled in the art will appreciate that by equipping the battery pack 1704 with the mating projections 1722,1723, 1800 and 1801, rather than the mating recesses of prior art battery connection apparatuses, no additional space for recesses needs to be reserved at the ends 1708 and 1709; thereby, allowing for reduction in the length of the housing 1706 (i.e., the length 1719) and a better fit of housing 1706 to the standard rectangular solid shape of the battery 1702.

The battery pack 1704 has elongated fins 1900 and 1728 located on right and left sides 1710 and 1711, respectively, of housing 1706. In particular, fin 1900 is located at the front half of side 1710 (i.e., between the middle of side 1710 and edge 1716), while fin 1728 is located at the front half of side 1711 (i.e., between the middle of side 1710 and edge 1714).

The battery pack 1704 has contacts 1730, 1731, 1732 and 1733 carried on surface 1712 of housing 1706. Contacts 1730–1733 are located on the front half of surface 1712 (i.e., between the middle of surface 1712 and end 1708) such that a portion of each of contacts 1730–1733 overlaps edge 1718. Contacts 1730–1733 are positioned on surface 1712, the largest surface of housing 1706, so they can be dimensioned to ensure accurate connectivity. In the illustrated embodiment, each of contacts 1730–1733 has a length 1901, such as about 8 mm, which is greater than the height 1720 of end 1708, a width of about 2.5 mm and a spacing from neighboring ones of contacts 1730–1733 of about 1 mm. Contacts 1730–1733 are formed of plated beryllium copper or other suitable metallic material and, preferably, insert molded into housing 1706 so as to be fixed in a position substantially parallel to surface 1712. Contacts 1730–1733 are electrically connected to the battery 1702 and battery circuitry (not shown) disposed in housing 1706 via spot welding or other suitable process.

Thus, the battery connection apparatus 115 is realized in a dimensionally constrained, easily portable battery pack— the battery pack 1704. The projections 1722, 1723, 1800 and 1801 of the battery pack 1704 are suitably located and sufficient in number to permit captivation by any one of numerous plausible mating arrangements. Contacts 1730–1733 are sufficient in location, dimension and spacing to permit easy and accurate connectivity. The benefits of the battery pack 1704 will further be evident from the discussion that follows.

The battery connection apparatus 115 can be further extended to include portions of the portable radiotelephone 100 that captivate the battery pack 1704 and electrically connect the battery 1702 to the electronic circuitry of the transceiver board 1300. As shown in FIGS. 17 and 18, the battery connection apparatus 115 further includes the lower housing 108, which has the electronic circuitry of the transceiver board 1300 disposed therein and is adapted to receive housing 1706 of the battery pack 1704 in a recess 1740. The recess 1740, as well as the lower housing 108, is molded from polycarbonate or other suitable material to have front and rear endwalls 1742 and 1743; a right sidewall 1744 extending between, and orthogonal to, the endwalls 1742 and 1743 and joining endwall 1742 at corner 1810; a left sidewall 1745 extending between, and orthogonal to, the endwalls 1742 and 1743 and joining endwall 1742 at corner 1811; and a base 1746 extending between, and orthogonal to, the endwalls and sidewalls 1742–1745 and joining endwall 1742 at corner 1812. In the illustrated embodiment, the endwalls 1742 and 1743 are spaced by a distance 1747, such as about 51.25 mm, which is just slightly larger than a length 1719 of housing 1706 of the battery pack 1704; the sidewalls 1744 and 1745 are spaced by a slightly varying distance 1748, which ranges from about 36.5 mm to about 39 mm and is larger than the length 1721 of housing 1706 of the battery pack 1704; endwall 1742 has a height 1814, such as about 7 mm as measured between the base 1746 and a top edge 1749 of endwall 1742, which is about the same as the height 1720 of end 1708 of housing 1706 of the battery pack 1704; and endwall 1743 has a height 1750, such as 5 mm as measured between the base 1746 and a top edge 1751 of endwall 1743, which is less than the height 1720 of end 1708 of housing 1706 of the battery pack 1704.

Rectangular receiving slots 1752, 1753, 1816 and 1817 of the battery connection apparatus 115, as shown in FIGS. 17 and 18, are formed in the recess 1740 of the lower housing 108. Receiving slots 1752 and 1753 are located on right and left halves of endwall 1743, respectively, such as about 2 mm from the sidewalls 1744 and 1745, respectively. Receiving slots 1752 and 1753 are bounded adjacent to top edge 1751 of endwall 1743 by inner flat ceiling surfaces 1754 and 1755, respectively. Receiving slots 1816 and 1817 are located on endwall 1742 at corner 1812 so as to be coplanarly aligned with the base 1746. Receiving slot 1816 is further located on the right half of endwall 1742 (i.e., between the middle of endwall 1742 and corner 1810), such as about 3.5 mm from corner 1812. Receiving slot 1817 is further located on the left half of endwall 1742 (i.e., between the middle of endwall 1742 and corner 1811), such as about 3.5 mm from corner 1811. In the illustrated embodiment, receiving slots 1816 and 1817 are slightly more than 3 mm wide and slightly more than 2 mm tall as measured from the base 1746 to top edges 1818 and 1819 of the receiving slots 1816 and 1817, respectively.

Figure 20:
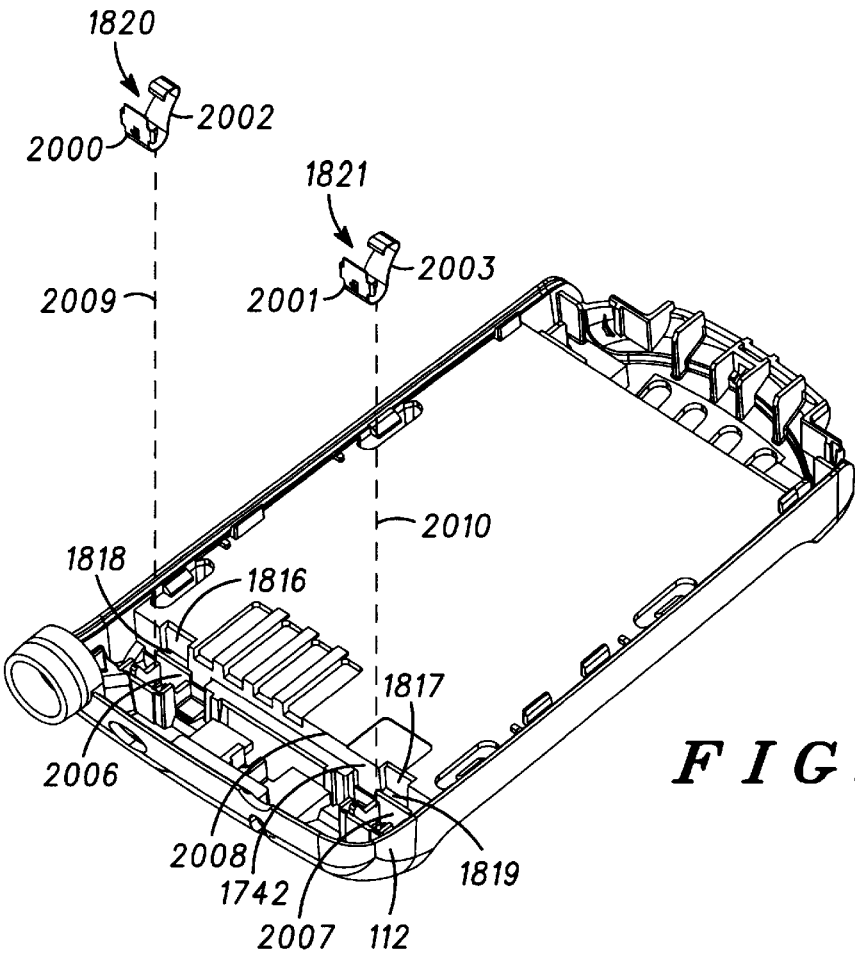
FIG. 20 is a perspective view of an inner surface of the rear housing portion of the lower housing of the portable radiotelephone of FIG. 1 showing springs of the battery connection apparatus of FIG. 17 exploded therefrom.

Receiving slots 1816 and 1817 carry springs 1820 and 1821, respectively, of the battery connection apparatus 115. The springs 1820 and 1821 are located in, and do not extend outside of, receiving slots 1816 and 1817, respectively. The springs 1820 and 1821, which are shown in FIG. 20 separated from the rear housing portion 112, are substantially V-shaped spring fingers formed of integrally joined front and rear arms 2000, 2001, 2002 and 2003. Each of the front arms 2000 and 2001 employ, on an end opposite to respective ones of the rear arms 2002 and 2003, a mounting surface having a locking tooth. Each of the rear arms 2002 and 2003 employ, on an end opposite to respective ones of the front arms 2000 and 2001, a force receiving, nose-shaped surface. The springs 1820 and 1821, which are shown in a rest position in FIG. 20, are deflectable to move arms 2002 and 2003 towards arms 2000 and 2001, respectively. In the illustrated embodiment, the springs 1820 and 1821 are stamped from a thin sheet of beryllium copper or other suitable material and are bent into the aforementioned configuration so that each of arms 2002 and 2003 exhibit a spring force of about 0.15 N/mm or other suitable value.

Springs 1820 and 1821 are assembled into receptacles 2006 and 2007, respectively, which are formed into an inner surface 2008 of the rear housing portion 112 behind receiving slots 1816 and 1817, respectively. Assembly of the springs 1820 and 1821 is depicted by dotted lines 2009 and 2010, respectively. Upon assembly, the mounting surfaces of arms 2000 and 2001 are anchored to the receptacles 2006 and 2007, respectively, while the noses of arms 2002 and 2003 reside in the receiving slots 1816 and 1817, respectively. Once assembled, the nose of each of arms 2002 and 2003, upon reception of a sufficient force, is movable in a plane substantially perpendicular to endwall 1742.

Referring back to FIGS. 17 and 18, the battery connection apparatus 115 further includes a latch 1757 to removably secure the cover 114 in a position enclosing the recess 1740. The latch 1757 is movably carried on the rear housing portion 112 and defines a portion of endwall 1742. In the illustrated embodiment, the latch 1757 is located at the middle of endwall 1742 about 6 mm from each of receiving slots 1816 and 1817, and occupies about 70 percent of the height 1814 of the endwall 1742 at that location. Although leaving very little or no space on endwall 1742 for additional structures such as electrical contacts, the latch 1757 permits secure engagement of the cover 114, which is molded to coincide with the thin form factor designated by the rear housing portion 112.

The battery connection apparatus 115 further includes contacts 1760, 1761, 1762 and 1763 mounted on the transceiver board 1300 and electrically connected to the electronic circuitry of the transceiver board 1300. Contacts 1760–1763 are carried in the recess 1740 of the rear housing portion 112 following assembly of the transceiver board 1300 between the front and rear housing portions 110 and 112 such that contacts 1760–1763 extend through slotted openings 1764, 1765, 1766 and 1767, respectively, formed in the base 1746 of the recess 1740. Each of contacts 1760–1763 employ a spring finger having a force receiving, nose-shaped surface that is deflectable in a plane substantially perpendicular to the base 1746. In the illustrated embodiment, each of contacts 1760–1763 are formed of beryllium copper or other suitable metallic material and are bent into the aforementioned configuration so that the nose-shaped surface of each exhibits a spring force of about 0.2 N/mm or other suitable value.

Figure 21:
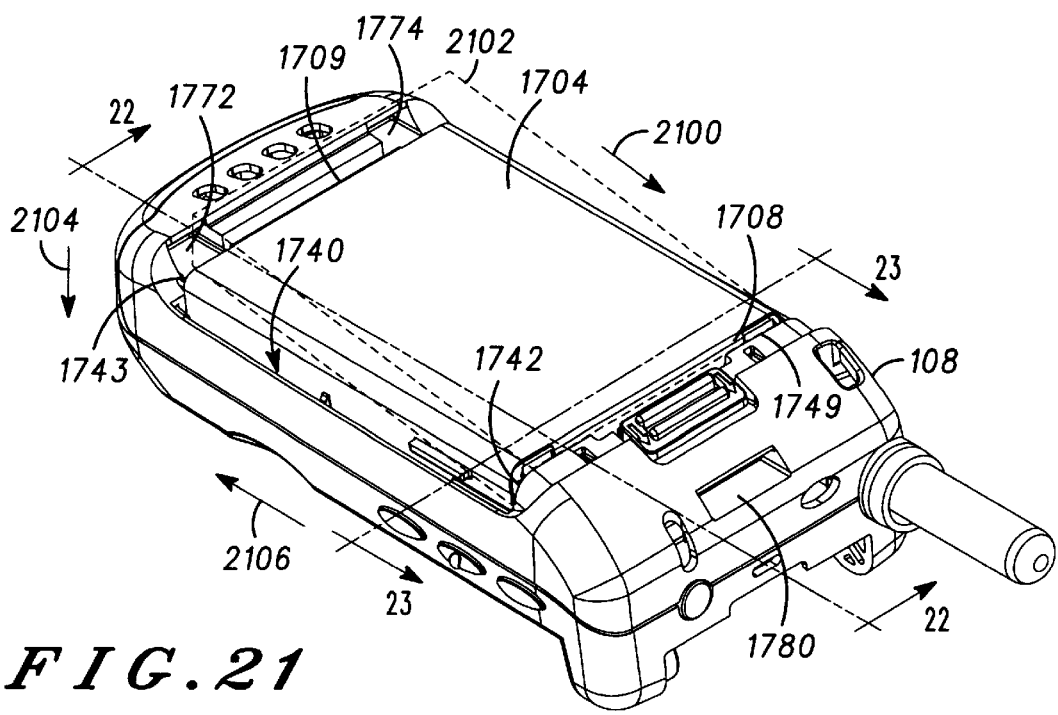
FIG. 21 is a rear, left side and top perspective view of the lower housing of the portable radiotelephone of FIG. 1 showing the battery pack received by the lower housing.

To utilize the portions of the battery connection apparatus 115 resident on the portable radiotelephone 100, the battery pack 1704 is assembled to the lower housing 108, as shown in FIG. 21. The battery pack 1704 is oriented at a slight angle, such as 15 degrees, with respect to the base 1746 of the recess 1740 of FIGS. 17 and 18 and positioned in the recess 1740 such that a top edge of end 1708 abuts top edge 1749 of endwall 1742, as depicted by arrow 2100 of FIG. 21 and the broken line showing 2102 of the battery pack 1704. Upon abutment of the end 1708 and endwall 1742, projections 1722 and 1723 of FIGS. 17 and 18 are received in receiving slots 1816 and 1817, respectively, such that distal ends 1726 and 1727 of the projections 1722 and 1723 engage and depress springs 1820 and 1821, respectively. Next, end 1709 of the battery pack 1704 is moved into the recess 1740, as depicted by arrow 2104 of FIG. 21, sliding angled surfaces 1804 and 1805 of FIGS. 17 and 18 of projections 1800 and 1801, respectively, past top edge 1751 of endwall 1743. End 1709 is moved until projections 1800 and 1801 align with receiving slots 1752 and 1753, respectively. During this movement of end 1709 of the battery pack 1704, contacts 1730–1733 of the battery pack 1704 engage and depress contacts 1760–1763, respectively, carried in the recess 1740. To complete assembly, the battery pack 1704 is released allowing the springs 1820 and 1821 to extend and urge the battery pack 1704 in the direction of arrow 2106 of FIG. 21 until projections 1800 and 1801 are received in receiving slots 1752 and 1753, respectively.

Once assembled, the battery pack 1704 is securely received in the lower housing 108 and the battery 1702 is electrically connected to the electronic circuitry of the transceiver board 1300. As shown in FIG. 22, end 1708 of the battery pack 1704 juxtaposes, but does not abut, endwall 1742 of the recess 1740; end 1709 of the battery pack 1704 abuts endwall 1743 of the recess 1740; and surface 1712 of the battery pack 1704 juxtaposes the base 1746 of the recess 1740. Projection 1801 is received in receiving slot 1753, and projection 1723 is received in receiving slot 1817. Spring 1821 remains partially loaded to exert a force in the direction of arrow 2200 sufficient to ensure that end 1709 remains in abutment with endwall 1743 and projection 1801 remains received in receiving slot 1753. The combined length of housing 1706 (i.e., the length 1719 of FIG. 17) and projection 1723 is slightly larger than the length 1747 of the recess 1740, thereby, ensuring that projection 1723 remains received in receiving slot 1817. Referring to FIGS. 22 and 23, contacts 1760–1763 exert a force on contacts 1730–1733, respectively, in the direction of arrow 2300 that ensures good electrical connectivity between contacts 1730–1733 and 1760–1763 and, also, further secures the battery pack 1704 by biasing surface 1803 of projection 1801 against surface 1755 of receiving slot 1753 and biasing projection 1723 against top edge 1819 of receiving slot 1817.

To avoid separation or gapping at the junction 113 of the front and rear housing portions 110 and 112 that could result from the force exerted by the contacts 1760–1763 on the rear housing portion 112 via the battery pack 1704, the battery connection apparatus 115 further includes housing snap assemblies 2302 and 2303 positioned in-line with contacts 1760–1763. The housing snap assemblies 2302 and 2303, which operate to join the front and rear housing portions 110 and 112, are integrally formed on the front housing portion 110 and the base 1746 of the recess 1740 proximate to the sidewalls 1744 and 1745, respectively. In particular, as shown in FIGS. 14,17,18 and 23, the snap assembly 2302 is formed of interlocking hoop 1316 and recess 1380, and the snap assembly 2303 is formed of interlocking hoop 1313 and recess 1376. By locating the snap assemblies 2302 and 2303 so that contacts 1760–1763 are aligned therebetween, as shown in FIG. 23, a more reliable, robust attachment of the front and rear housing portions 110 and 112, which is capable of withstanding forces exerted by contacts 1760–1763, is realized.

The battery pack 1704 is disassembled from the lower housing 108 by substantially reversing the steps previously described with respect to assembly shown in FIG. 21. First the battery pack 1704 is pushed in the direction opposite to arrow 2106 until projections 1800 and 1801 are removed receiving slots 1752 and 1753, respectively; springs 1820 and 1821 in receiving slots 1816 and 1817, respectively, are depressed by projections 1722 and 1723, respectively; and end 1708 abuts endwall 1742. Next, end 1709 of the battery pack 1704 is swung in the direction opposite to arrow 2104 until projections 1800 and 1801 clear endwall 1743. Once clear, the battery pack 1704 can be lifted away from the recess 1740 and the lower housing 108.

Aside from releasable attachment to the portable radiotelephone 100, it will be recognized that the battery connection apparatus 115 formed of the battery pack 1704 permits connection to other devices, such as a desktop charging device. For example, the fins 1728 and 1900 of the battery pack 1704 allow vertical positioning in a well of the charging device by engaging opposing vertical guide slots formed therein. Such positioning, permits a reduction in the length and total footprint area of the charging device.

Figure 24:
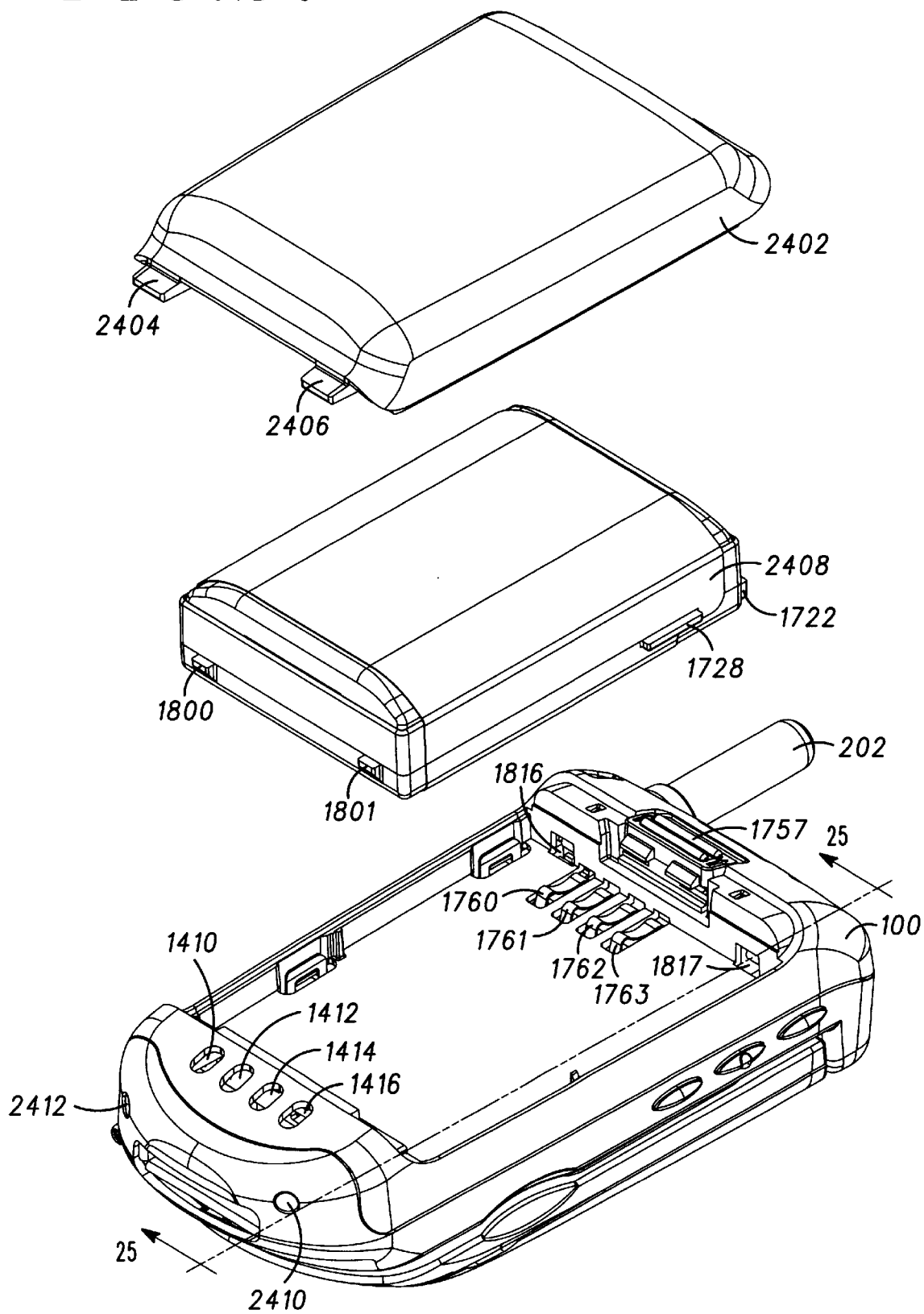
Figure 25:
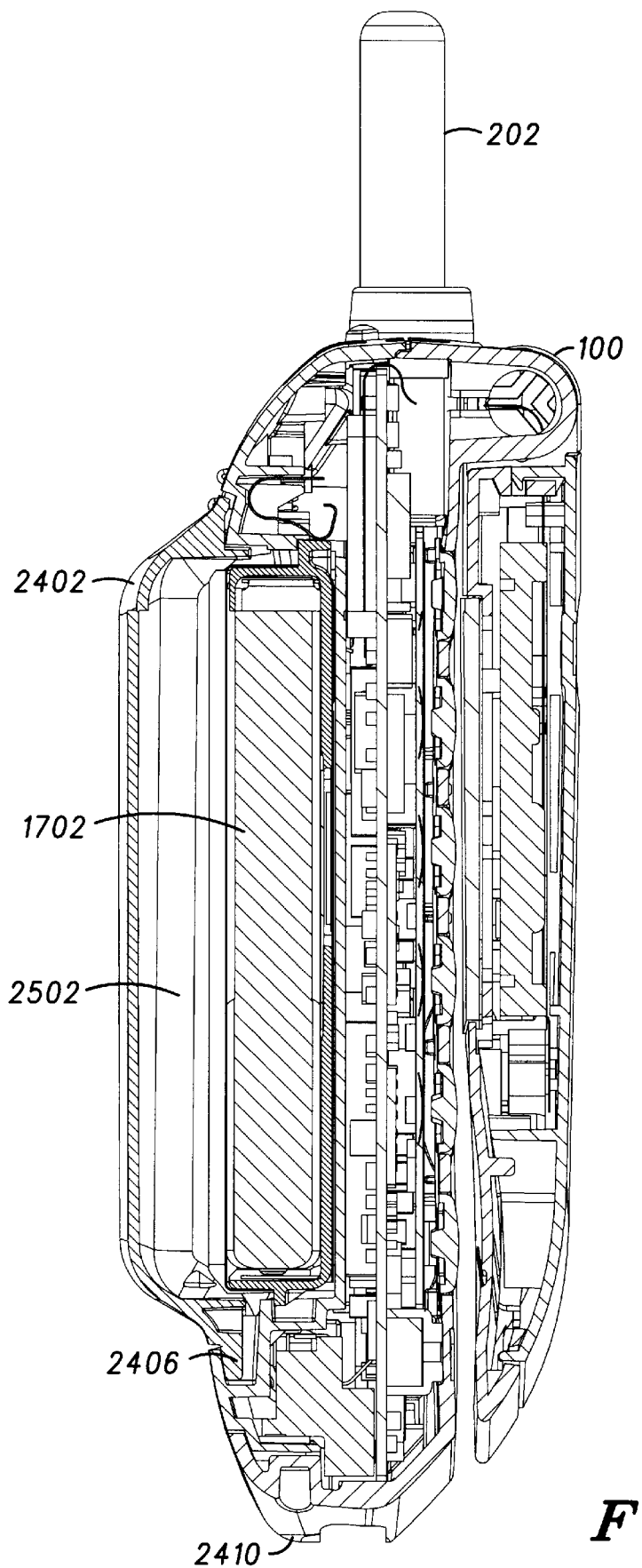

Turning now to FIG. 24, an exploded view shows an alternate embodiment of a radiotelephone of the present invention having an enlarged battery cover 2402 having flanges 2404 and 2406, and adapted to cover an enlarged battery 2408. Battery 2408 could be for example an LSQ8 cell encapsulated in a plastic housing. As shown in the cross-section of FIG. 25, the self-locking feature of battery 1702 enables the use of enlarged cover 2402 with battery 1702. That is, a space 2502 remains between the battery and the enlarged cover 2402.

Figure 26:
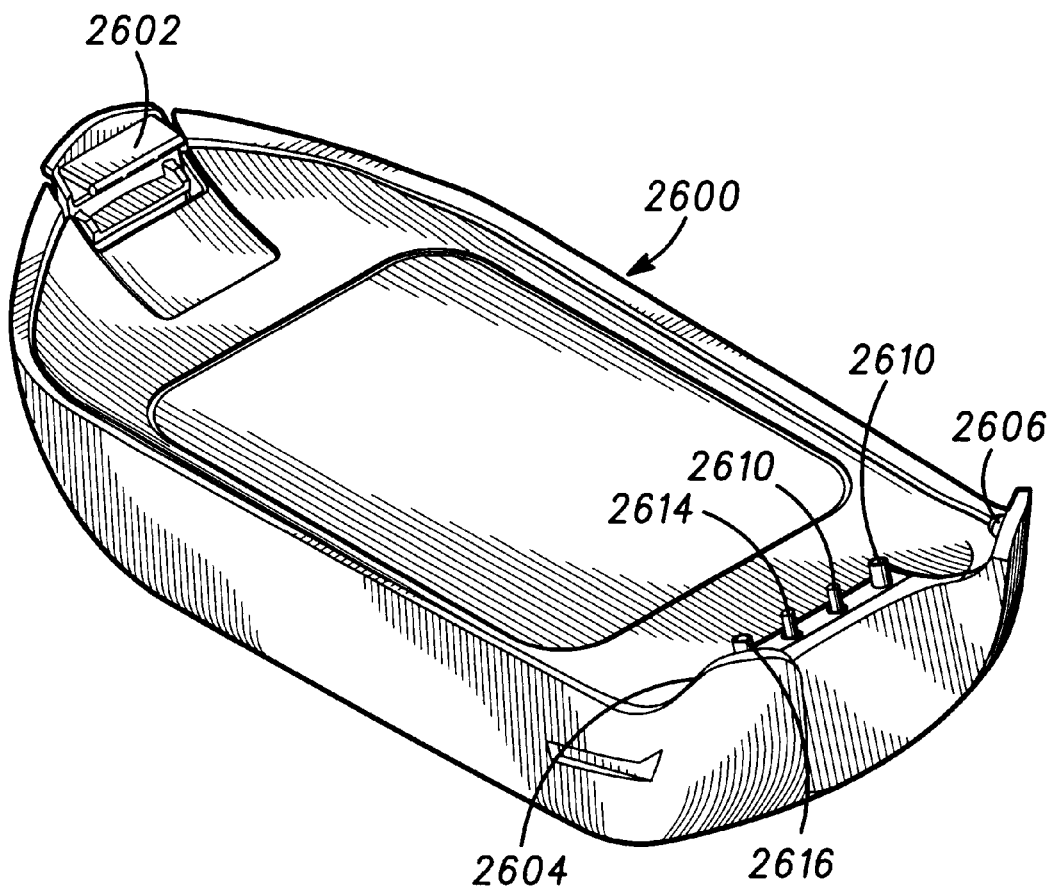
Figure 27:
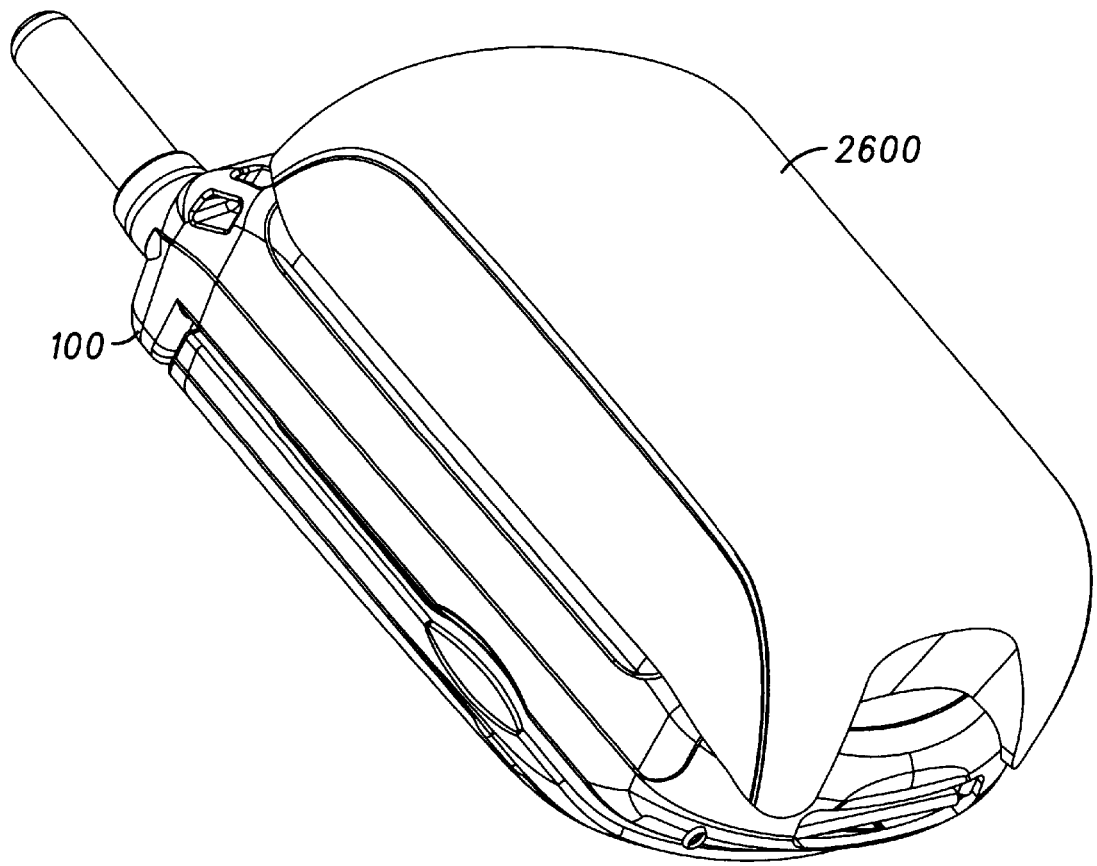

Turning now to FIG. 26, a perspective views shows an auxiliary battery 2600 having a latch 2602 and prongs 2604 and 2606. Latch 2602 is adapted to mate with recess 1780 and prongs 2604 and 2606 are adapted to mate with 1322 and 1324. Also shown are contacts 2610, 2612, 2614 and 2616 which are adapted mate with corresponding contact 1410, 1412, 1414, and 1416. FIG. 27 shows auxiliary battery 2600 attached to radiotelephone 100.

Figure 28:
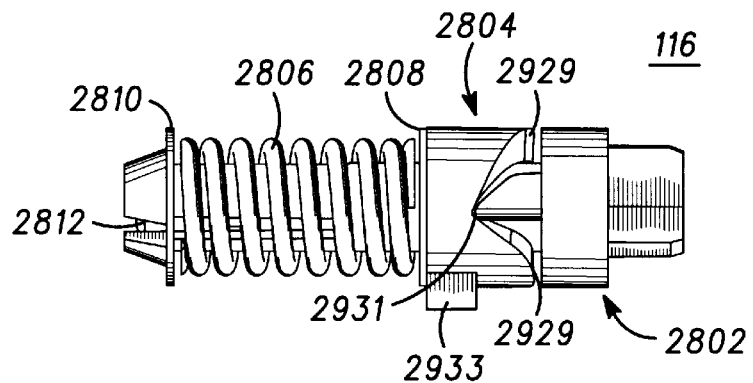
FIG. 28 is an elevational view of an assembled hinge configured in accordance with the present invention.

As embodied herein and referring to FIG. 28, a hinge 116 joins upper housing 102 to lower housing 108 (FIG. 1). Hinge 116, which is described in detail below, is shown fully assembled in the elevational view of FIG. 28 and exploded in the perspective view of FIG. 29. FIG. 30, which shows a cross sectional view of the radiotelephone 100 of FIG. 2 in the closed position, illustrates the coupling of the assembled hinge 116. When the radiotelephone is assembled, the hinge 116 is disposed in a barrel 118 of upper housing 102. The upper housing 102, with hinge 116 received therein, is rotatably coupled between two knuckles 117, 119 (FIG. 1) of lower housing 108. The design of hinge 116 allows upper housing 102 to be held against an upper surface of the lower housing 108, as shown in FIG. 2 and at an obtuse angle in the open position, as shown in FIG. 1.

An advantage of the preferred embodiment of the present invention is that the elements can be assembled independently of the radiotelephone housings. After assembly of hinge 116, the assembled components, rather than the individual components, can be handled by assemblers when disposing hinge 116 in the radiotelephone 100. Also, unlike the hinge disclosed in U.S. Pat. No. 5,628,089, the hinge 116 of the present invention does not include a can to keep the hinge components together.

The details of the hinge 116 are now described. Referring to FIG. 28, the hinge 116 includes a stationary element, such as a follower 2802, two moveable elements, such as a cam 2804 and a spring 2806, two friction washers 2808, 2810 and a rod 2812 held in engagement to provide a self contained hinge 116.

Figure 29:
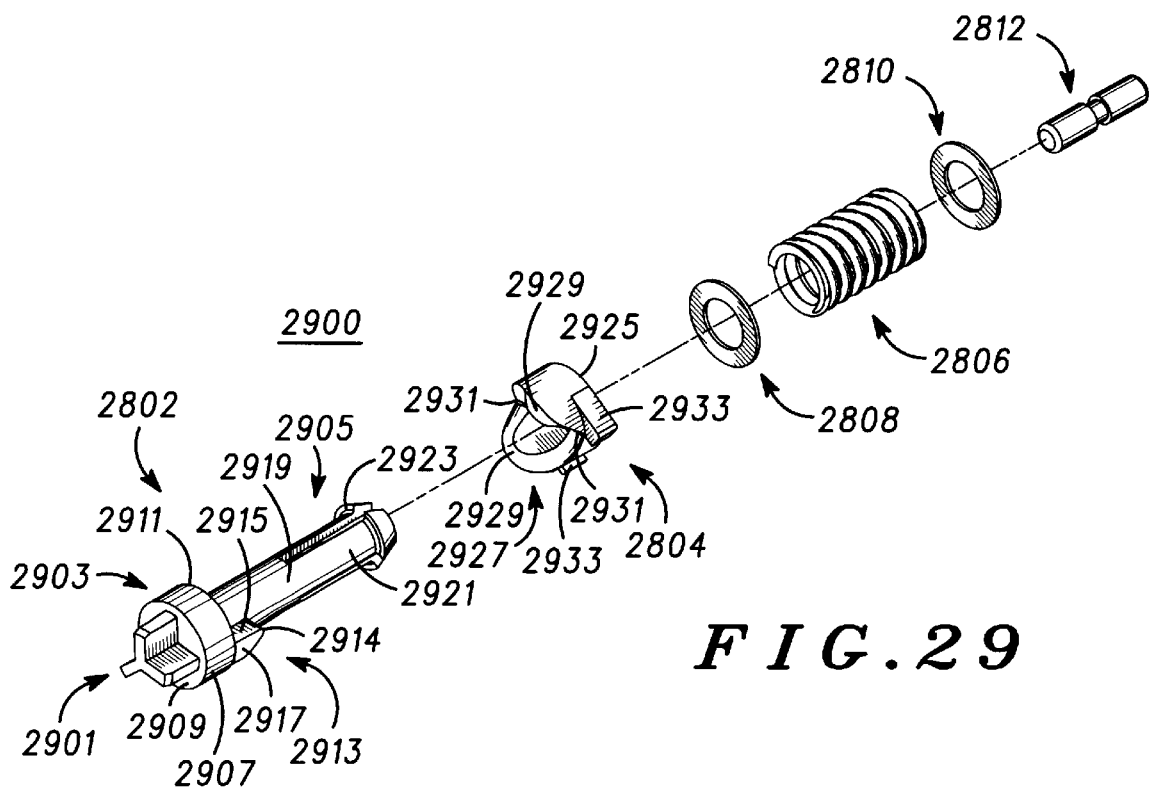
FIG. 29 is an exploded view of the hinge assembly shown in FIG. 28.
Figure 30:
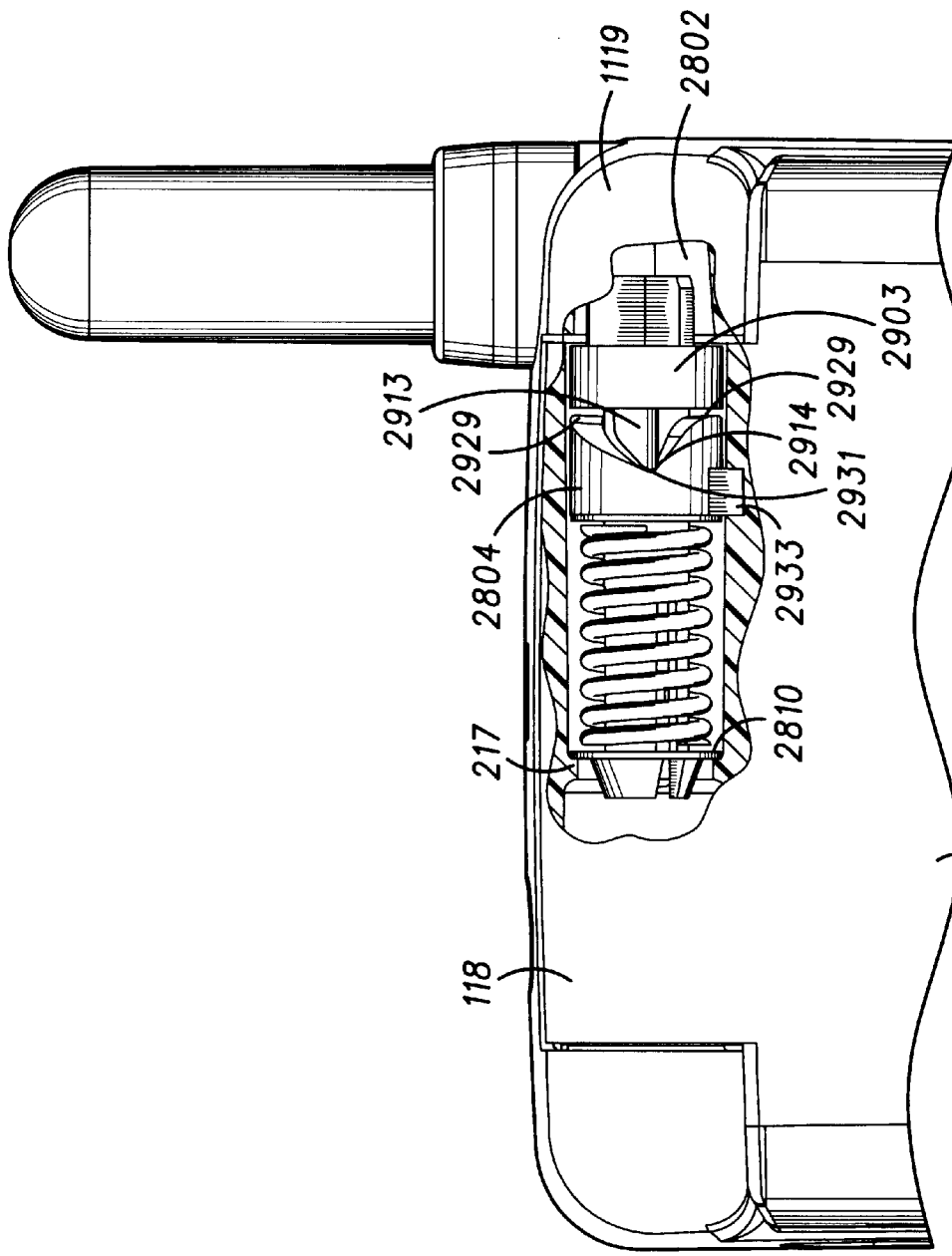
FIG. 30 is a cross sectional view of the radiotelephone illustrated in FIG. 1, taken along its rotating axis.

Referring to FIG. 29, an exploded left perspective view of the preferred embodiment of the hinge 116 is shown. The follower 2802 includes three integrally formed portions: a connector 2901, preferably Y-shape or other suitable shape, a body 2903 and a shaft 2905. Preferably, the follower 2802 is injection molded using an acetal resin or Teflon material commercially available from many sources. The Y-shape connector 2901 mates with an aperture (not shown) in one of the knuckles 117, 119 of the radiotelephone lower housing 108. The aperture is shaped to received the Y-shape connector 2901 and lock the hinge in place.

The follower body 2903 is formed of a cylindrical portion 2907 having a flat bottom surface 2909 and a flat top surface 2911. Coupled to the top surface 2911 of the follower body 2903 are a plurality of tabs 2913, preferably two (only one shown). The tabs 2913 have a flat first surface 2915 and a curved second surface 2917. In the preferred embodiment, the tabs 2913 are spaced 180 degrees from one another. Also coupled to the top surface 2911 of the follower body 2903 and received between the tabs 2913 is a tubular-shaped shaft 2905.

The shaft 2905 preferably includes a solid portion 2919 and a portion comprised of a plurality of equally spaced spring retaining prongs 2921 arranged in a circular manner. The number of spring retaining prongs 2921 is preferably three. Each prong 2921 preferably forms a lip 2923 at an end of the prong. To ensure that the outer diameter of the shaft 2905 is slightly less than the inner diameter of the spring 2806, a rod 2812 is received between the prongs 2921 such that an inner surface of each prong is pressed firmly against the rod 2812. The rod is preferably made of ABS.

The cam 2804 is preferably injection molded using a Teflon filled resin material commercially available from many sources, and is generally cylindrically shaped and hollow. One end of the cam 2804 forms a flat ring surface 2925. The other end of the cam 2804 is shaped with a profile 2927 having peaks 2929 and valleys 2931 (also illustrated in FIG. 28) to mate with the top surface 2911 of the follower body 2903. During assembly of the hinge 116, the profile end 2927 of the cam 2804 is inserted over the follower shaft 2905 and mates with the top surface 2911 of the follower body 2903 such that the follower tabs 2913 are received in the valleys 2931 of the cam 2804 as shown in FIG. 28.

The cam 2804 also includes a plurality of ribs 2933. The ribs 2933 are received in slots (not shown) formed on the interior surface of the barrel 118 of the upper housing 102 so that the cam 2804 rotates with the radiotelephone upper housing 102 as the upper housing 102 is moved between the open and closed positions with respect to the radiotelephone lower housing 108. Because the follower connector 2901 is locked into one of the knuckles 117, 119 of the radiotelephone lower housing 108, the follower 2802 does not rotate when the upper housing 102 is moved between the open and closed positions.

The spring 2806 is composed of metal and is spiral shaped. During assembly of the hinge 116, the spring 2806 is placed over the follower shaft 2905 and coupled between the cam 2804 and the lips 2923 of the spring retaining prongs 2921 of the follower shaft 2905. In the preferred embodiment, a first friction washer 2808 is disposed between the flat ring surface 2925 of the cam 2804 and one end of the spring 2806 and a second friction washer 2810 is disposed between the other end of the spring 2806 and the lips 2923 of the spring retaining prongs 2921. The friction washers 2808, 2810 minimize the wear and tear on the cam 2804 and spring retaining prongs 2921 during rotation of the radiotelephone upper housing 102 between the open and closed positions.

Once the individual hinge components are assembled as described above, the hinge 116 provides a self-contained component that can be sold as an off the shelf component or directly incorporated into a radiotelephone during manufacture. If incorporated into the phone during manufacture, the hinge 116, as shown in FIG. 30, is disposed inside the barrel 118 of the radiotelephone upper housing 102. As illustrated, the follower connector 2901 is received in one of the phone body's knuckles 119 and is locked therein to prevent rotation of the follower 2802 as the phone upper housing 102 is opened and closed. At the opposite end of the follower, the second friction washer 2810 abuts a retaining shoulder 217 formed in the interior of the barrel 118. As mentioned previously, the ribs 2933 formed on the outer surface of the cam 2804 are received in grooves (not shown) in the interior of the barrel 118 so that the cam 2804 rotates with the upper housing 102 as it is opened and closed. As the upper housing 102 is rotated between the open and closed positions, the cam 2804 rotates about the follower body 2903 180 degrees such that each tab 2913 (only one shown) of the follower body 2903 is repositioned from one valley 2931 (or detent position) of the cam 2804 to an adjacent valley 2931 (detent position) of the cam 2804. When the upper housing 102 is moved from the open position to the closed position, rotation of the cam peaks 2929 past the tips 2914 of the tabs 2913 cause the upper housing 102 to spring closed. Likewise, when the upper housing 102 is moved from the closed position to the open position, rotation of the cam peaks 2929 in the opposite direction past the tips 2914 of the tabs 2913 causes the upper housing 102 to spring open. This feature enables the upper housing 102 to be easily opened and closed.

Figure 35:
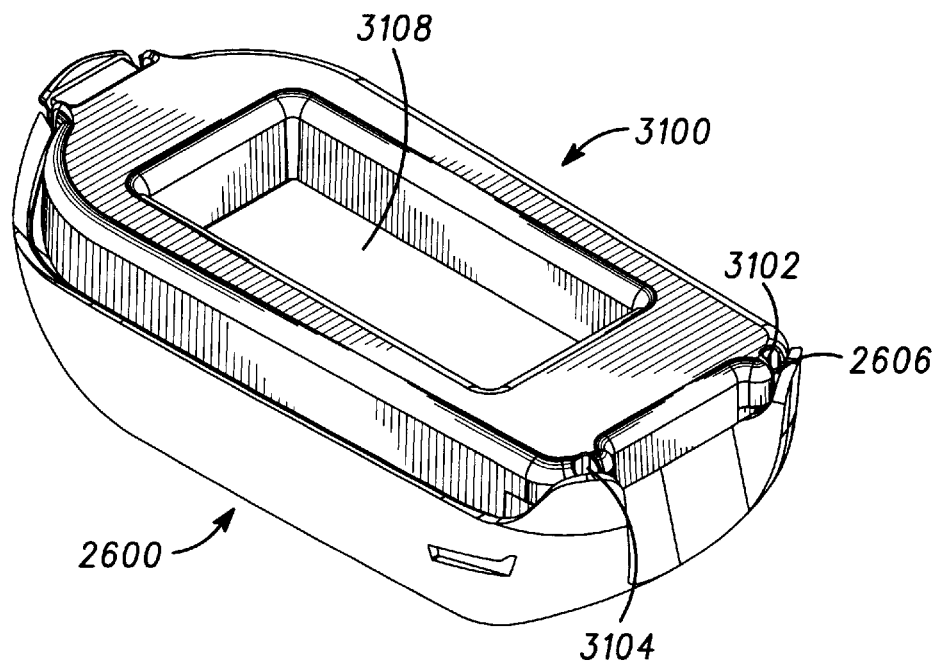
FIG. 35 is a front, left side and bottom view of protective cover 3100 attached to auxiliary battery 2600.
Figure 33:
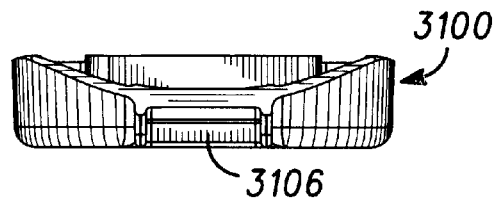
FIG. 33 is a top elevational view of protective cover 3100.
Figure 34:
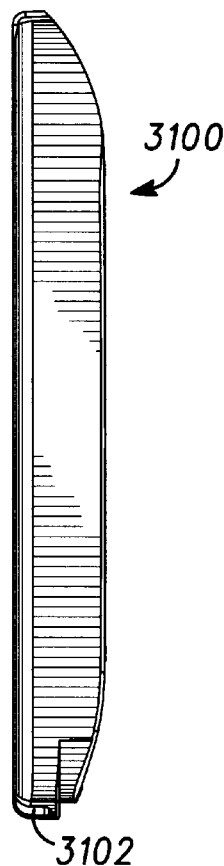
FIG. 34 is a right side elevational view of protective cover 3100.
Figure 32:
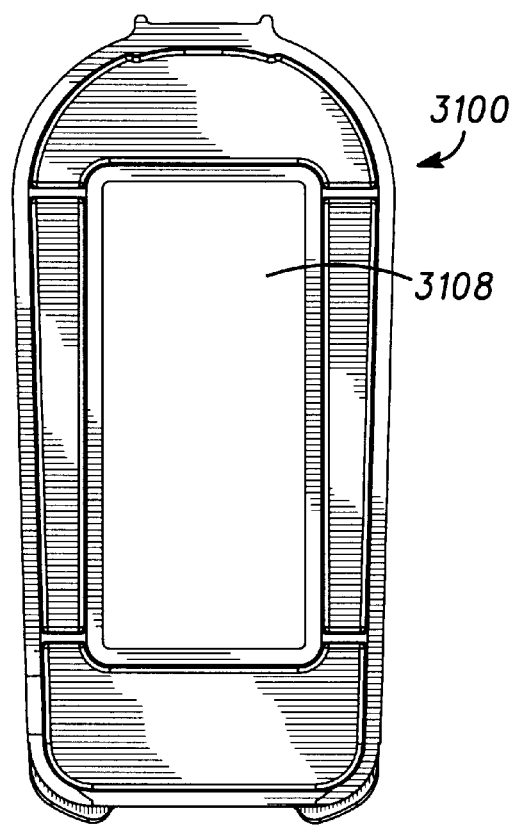
FIG. 32 is a rear plan view of protective cover 3100.
Figure 36:
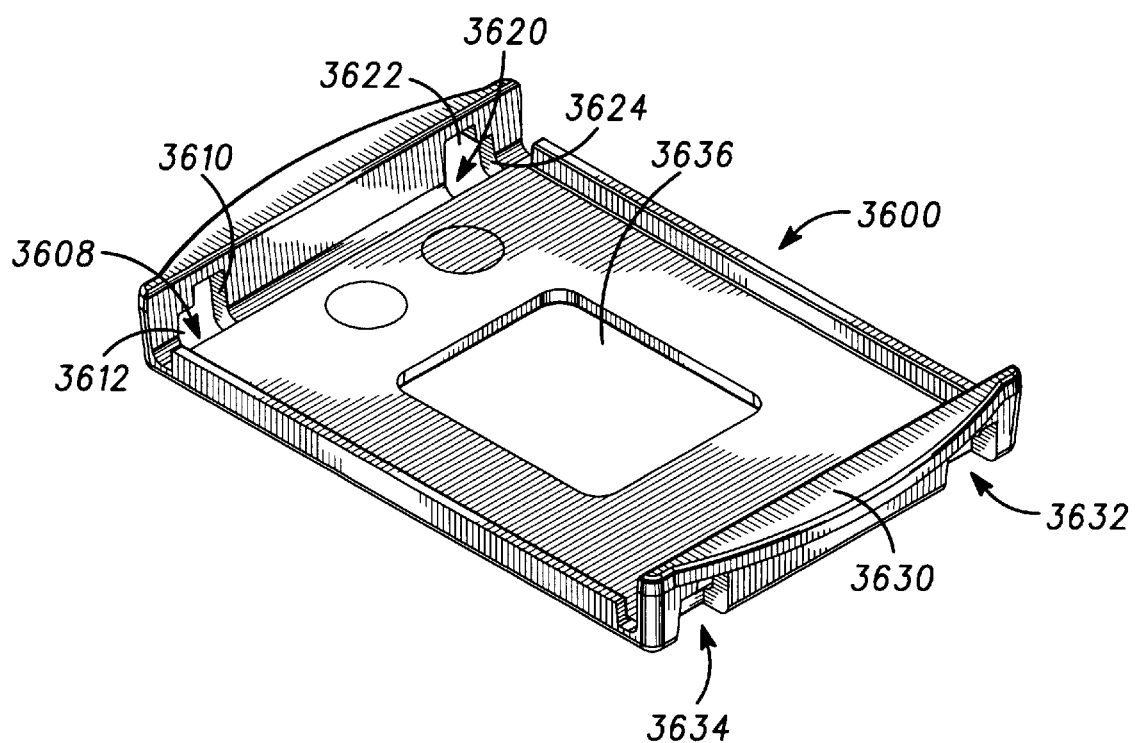
FIG. 36 is a front, left side and bottom perspective view of a protective cover 3100.
Figure 39:
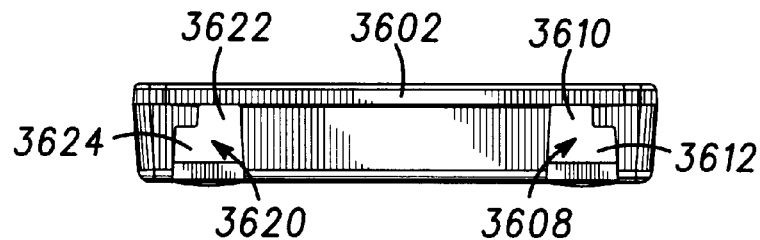
FIG. 39 is a right side elevational view of protective cover 3600.
Figure 38:
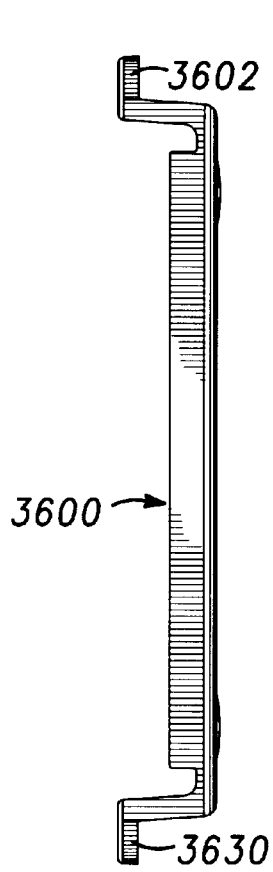
FIG. 38 is a top elevational view of protective cover 3600.
Figure 37:
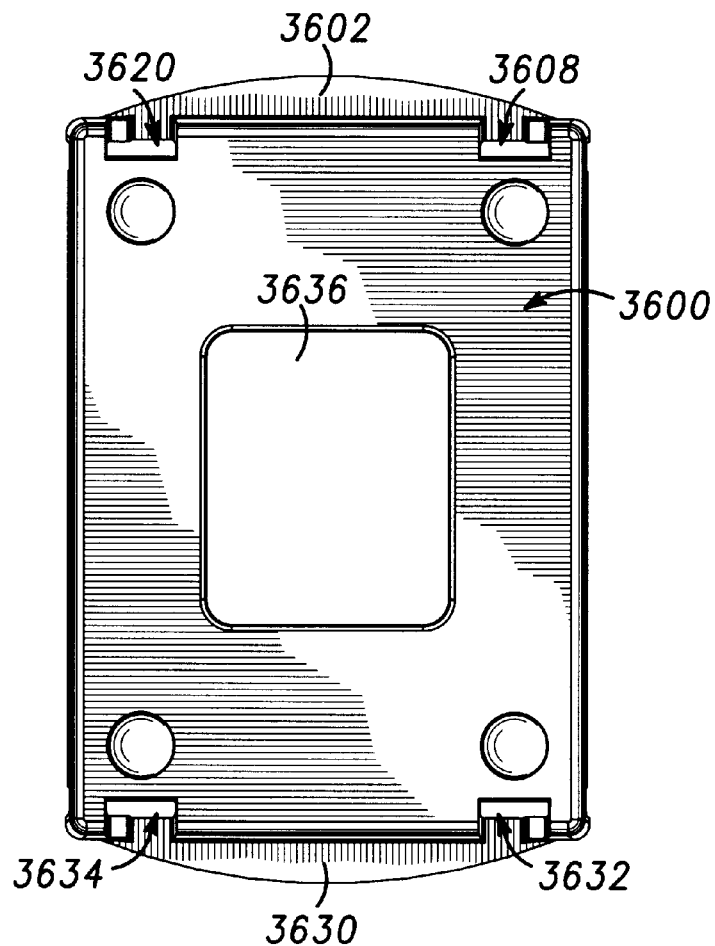
FIG. 37 is a rear plan view of protective cover 3600.

Turning now to FIGS. 31–35, a safety cover 3100 for auxiliary battery 2600 is shown. Safety cover 3100 includes recesses 3102 and 3104 for receiving prongs 2606 and 2604, respectively. Safety cover 3100 further includes a recess 3106 for receiving latch 2602. Safety cover 3100 attached to auxiliary battery 2600 is shown in FIG. 35.

Figure 31:
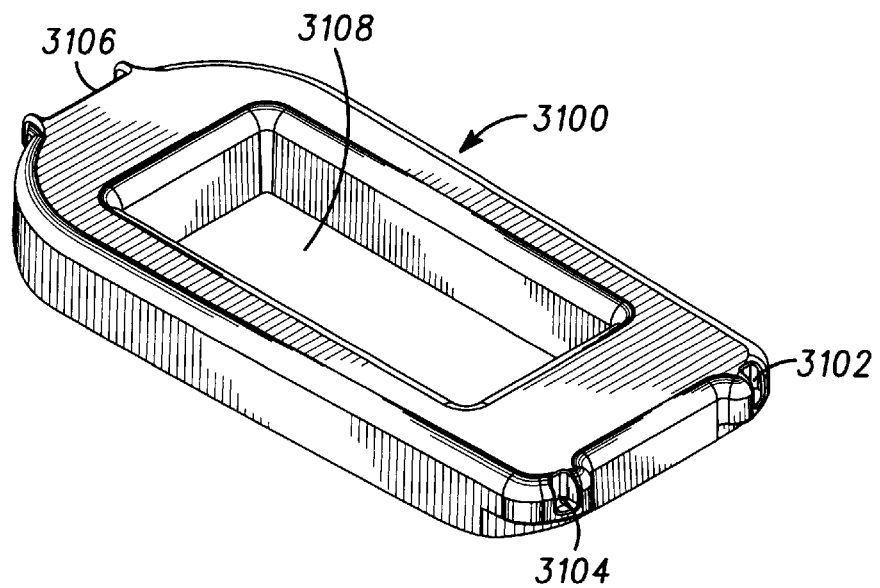
FIG. 31 is a front, left side and bottom perspective view of a protective cover 3100.
Figure 40:
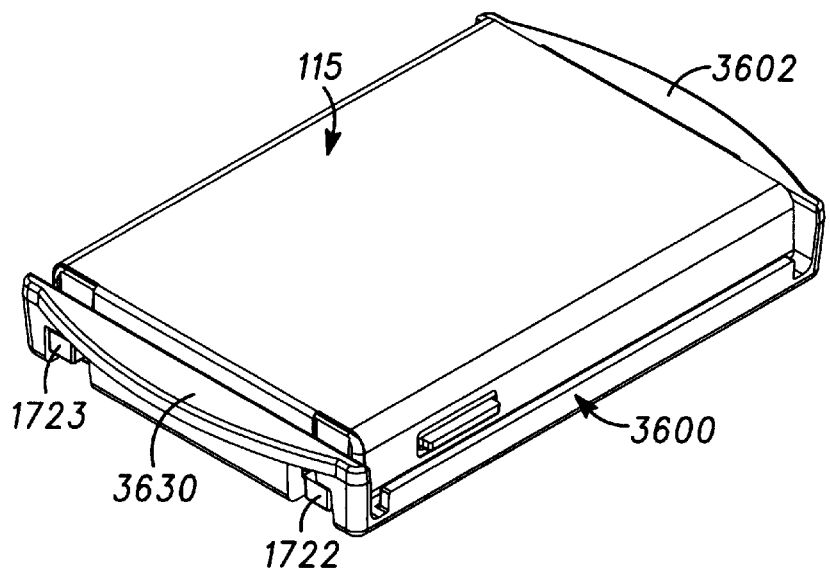
FIG. 40 is a front, left side and bottom view of protective cover 3100 attached to battery 1702.
Figure 41:
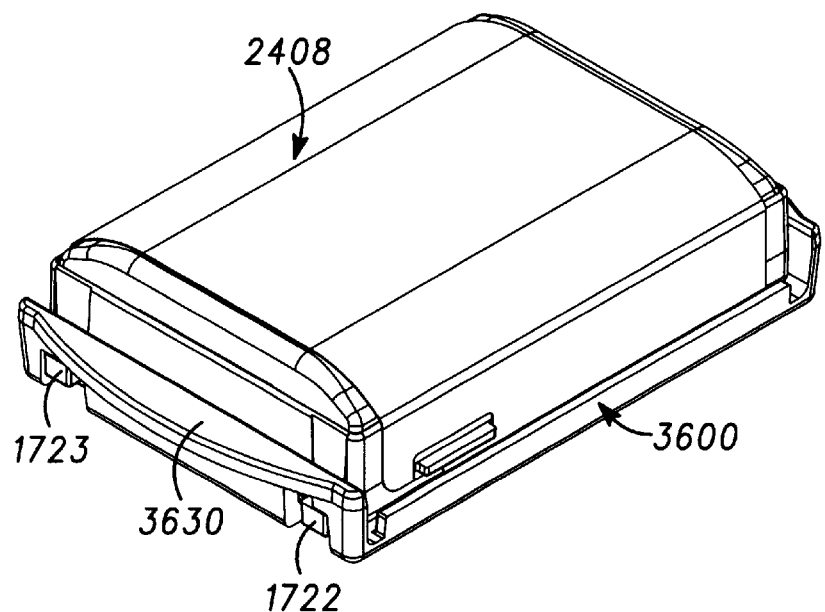
FIG. 41 is a front, left side and bottom view of protective cover 3100 attached to battery 2408.

Turning now to FIGS. 36–41, a safety cover 3600 for the main batteries is shown. Safety cover 3600 includes a handle 3602 having a recesses which are uniquely shaped for receiving projections 1722 and 1723 or projections 1800 and 1801. In particular, recess 3608 includes a first portion 3610 adapted to receive projection 1801 when the battery is inserted in a first orientation and a second portion 3612 to receive projection 1722 when the battery is inserted in a second orientation. Similarly, a recess 3620 includes a first portion 3622 adapted to receive projection 1801 when the battery is inserted in a first orientation and a second portion 3624 to receive projection 1722 when the battery is inserted in a second orientation. Safety cover 3600 further includes a handle 3630 having a recesses 3632 and 3634 which are also uniquely shaped for receiving projections 1722 and 1723 or projections 1800 and 1801 as described above. Safety cover 3600 attached to battery 1702 is shown in FIG. 40, while safety cover 3600 attached to battery 2408 is shown in FIG. 31. The safety cover is preferably made of a material that enables removal from the batteries by pressing downward on one of the handles.

Figure 42:
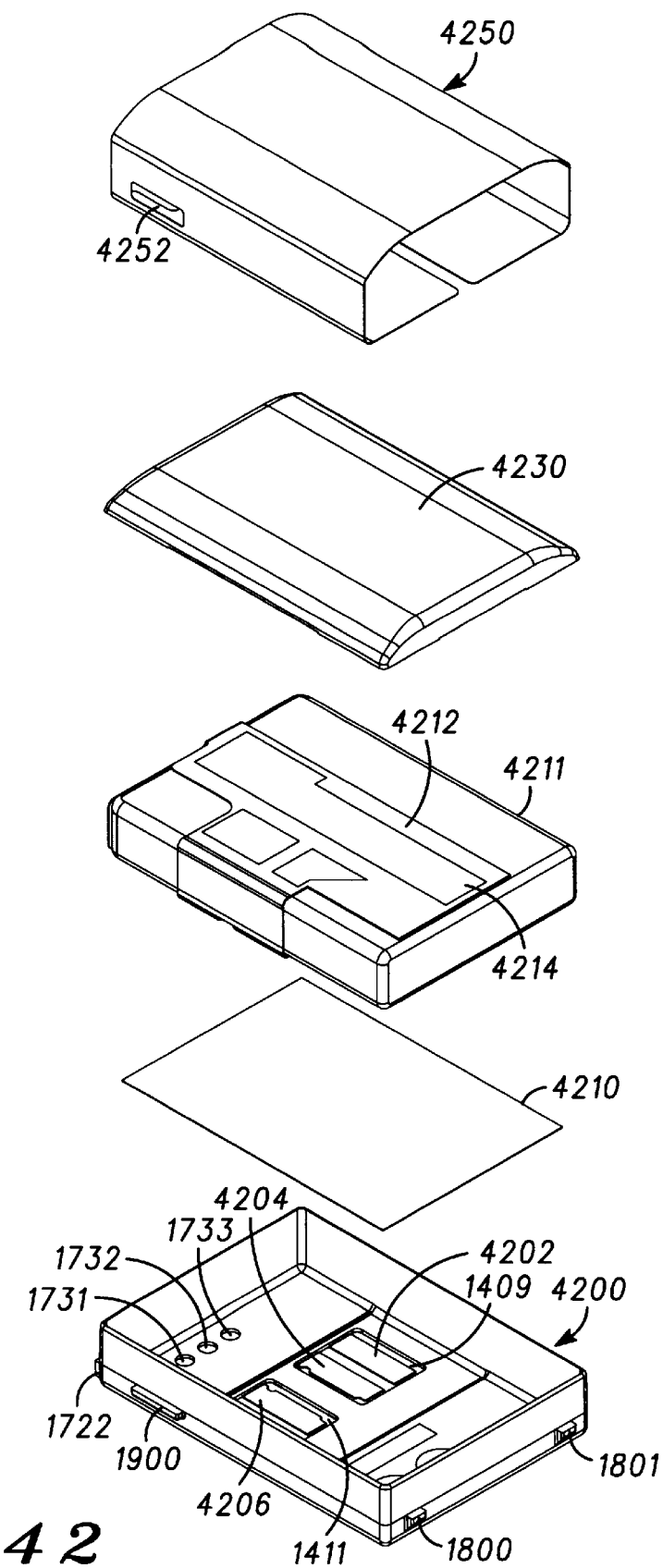
FIG. 42 is an exploded view as seen from the top of battery 2408 according to the present invention.
Figure 43:
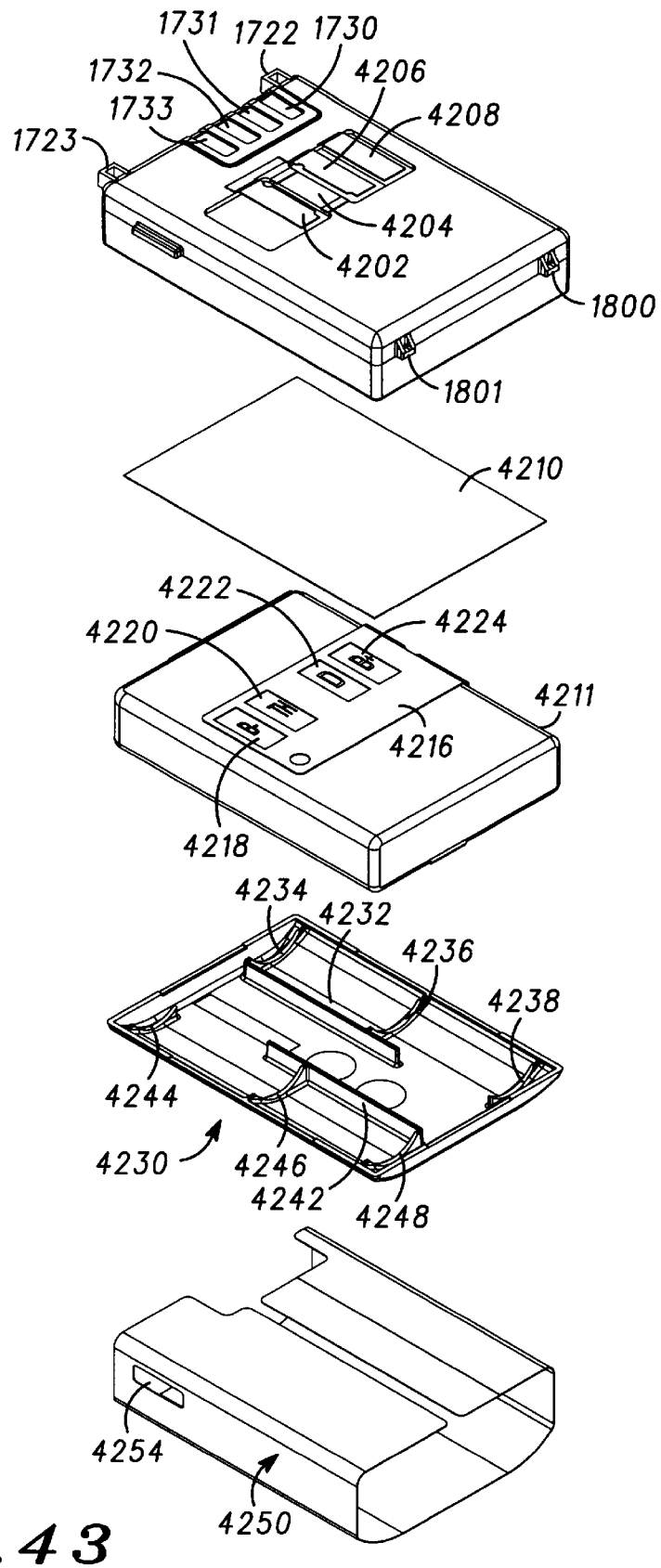
FIG. 43 is an exploded view as seen from the bottom of battery 2408 according to the present invention.

Turning now to FIGS. 42 and 43, an exploded view of battery 2408 is shown. In particular, a bottom housing 4200 includes contacts 4202, 4204, 4206, and 4208 which are formed in the housing and extend to contacts 1733, 1732, 1731 and 1730 respectively. Bottom housing 4200 includes an aperture 1409 and an aperture 1411 in the area of contacts 4202 through 4208. As will be described, the apertures enable the contacts to be spot welded to contacts on an electrochemical cell within the housing. An adhesive layer 4210, preferably a two-sided adhesive layer, is used to attach a cell 4211 to a bottom housing 4200. The adhesive layer is also used to correctly position a flex strip 4212 having a circuit 4214 on cell 4211. In particular, a rear portion 4216 of the flex strip includes contacts 4218, 4220, 4222 and 4224. The adhesive layer is used to correctly position the rear portion and contacts so that they are aligned properly with contacts 4202, 4204, 4206 and 4208 when the contacts are spot welded.

A top housing 4230 is positioned on the top of bottom housing 4200. The inside of top housing 4230 includes a wall 4232 and support walls 4234, 4236 and 4238. The top housing also includes a second wall 4242 and a second set of support members 4244, 4246, and 4248. The walls 4232 and 4242 provide a recess 4240 for protecting circuit 4214 of the flex strip 4212. The support walls provide support for standard AAA cells which could be used in the battery pack. That is, three AAA cells could be used in place of cell 4211. A flexstrip having a circuit would be positioned generally between two of the cells. Finally, a label 4250 having cutouts 4252 and 4254 is positioned around the assembled bottom housing and top housing.

While particular embodiments of the present invention have been shown and described, modifications may be made. It is therefore intended in the appended claims to cover all such changes and modifications which fall within the true spirit and scope of the invention.

What is claimed is:

1. A foldable portable radiotelephone comprising:

a first housing;

a second housing hingedly connected to said first housing, said second housing having a recess for receiving a battery pack;

a battery cover for covering said battery pack;

a detachable battery coupled to said radiotelephone and covering at least a portion of said battery cover.

2. The foldable portable radiotelephone of claim 1 wherein said first housing further includes a display.

3. The foldable portable radiotelephone of claim 1 wherein said first housing further includes a speaker.

4. The foldable portable radiotelephone of claim 1 wherein said second housing further includes a keypad.

5. The foldable portable radiotelephone of claim 1 wherein said second housing further includes an antenna.

* * * * *